(12) United States Patent
Gutierrez-Lemini et al.

(10) Patent No.: US 8,038,177 B2
(45) Date of Patent: Oct. 18, 2011

(54) PRESSURE ISOLATION SYSTEM FOR FLEXIBLE PIPE JOINTS

(75) Inventors: Danton Gutierrez-Lemini, Grand Prairie, TX (US); Todd M. Pottorff, Crowley, TX (US); George W. Peppel, Corsicana, TX (US); James G. Patrick, Azle, TX (US); Carl C. Spicer, Grand Prairie, TX (US); Jesner H. Pereira, Arlington, TX (US); Gregory P. Cruse, Arlington, TX (US)

(73) Assignee: Oil States Industries, Inc., Arlington, TX (US)

( * ) Notice: Subject to any disclaimer, the term of this patent is extended or adjusted under 35 U.S.C. 154(b) by 404 days.

(21) Appl. No.: 12/196,230

(22) Filed: Aug. 21, 2008

(65) Prior Publication Data
US 2009/0212558 A1    Aug. 27, 2009

Related U.S. Application Data

(63) Continuation-in-part of application No. 12/036,738, filed on Feb. 25, 2008.

(51) Int. Cl.
*F16L 27/103* (2006.01)
*F16L 27/10* (2006.01)
(52) U.S. Cl. .................................. 285/223; 285/263
(58) Field of Classification Search .................. 285/49, 285/223, 226, 263
See application file for complete search history.

(56) References Cited

U.S. PATENT DOCUMENTS
2,900,182 A    8/1959    Hinks
(Continued)

FOREIGN PATENT DOCUMENTS
WO    2009108644 A1    9/2009

OTHER PUBLICATIONS

"Steel Catenary Riser FlexJoint," Internet web page at oilstates.com, 2007, one page, Oil States Industries, Inc., Arlington, Tx.
(Continued)

*Primary Examiner* — James Hewitt
(74) *Attorney, Agent, or Firm* — Richard Auchterlonie; Novak Druce & Quigg, LLP

(57) ABSTRACT

A flexible pipe joint has two annular elastomeric flex elements stacked in a co-axial fashion at an inner radius from a common center of rotation, and at least one elastomeric flex element disposed at an outer radius from the common center of rotation. The flex elements at the inner radius are coupled mechanically in series between the extension pipe and the housing of the flexible pipe joint, and the flex element at the outer radius is coupled mechanically in parallel with the series combination of the inner flex elements. The inner flex elements isolate the flex element at the outer radius from transport fluid, and the flex element at the outer radius reduces the axial compression of the inner flex elements. Thus, the inner flex elements may have a reduced radius and a different composition to handle a higher loading of heat and pressure.

24 Claims, 14 Drawing Sheets

U.S. PATENT DOCUMENTS

| Patent No. | | Date | Inventor | Ref |
|---|---|---|---|---|
| 3,429,622 | A | 2/1969 | Lee et al. | |
| 3,519,260 | A | 7/1970 | Irwin | |
| 3,555,590 | A | 1/1971 | Halopoff | |
| 3,680,895 | A | 8/1972 | Herbert et al. | |
| 3,734,546 | A * | 5/1973 | Herbert et al. | 285/49 |
| 3,941,433 | A | 3/1976 | Dolling et al. | |
| 3,958,840 | A | 5/1976 | Hickox et al. | |
| 4,068,864 | A | 1/1978 | Herbert et al. | |
| 4,068,868 | A | 1/1978 | Ohrt | |
| 4,081,660 | A | 3/1978 | Uffer et al. | |
| 4,098,527 | A | 7/1978 | Herbert et al. | |
| 4,103,939 | A * | 8/1978 | Herbert et al. | 285/123.2 |
| 4,105,266 | A | 8/1978 | Finney | |
| 4,121,861 | A | 10/1978 | Gorndt | |
| 4,173,360 | A * | 11/1979 | Bergman et al. | 285/51 |
| 4,183,556 | A * | 1/1980 | Schwemmer | 285/51 |
| 4,263,243 | A | 4/1981 | Wilson et al. | |
| 4,324,194 | A | 4/1982 | Elliston | |
| 4,416,473 | A | 11/1983 | Lamy et al. | |
| 4,515,399 | A | 5/1985 | Sullivan et al. | |
| 4,570,979 | A * | 2/1986 | Moore | 285/223 |
| 4,593,941 | A | 6/1986 | Whightsil, Sr. | |
| 4,706,998 | A | 11/1987 | Peppel et al. | |
| 4,708,758 | A | 11/1987 | McGregor | |
| 4,759,662 | A | 7/1988 | Peppel | |
| 4,784,410 | A | 11/1988 | Peppel et al. | |
| 4,797,639 | A | 1/1989 | Driscoll | |
| 4,984,827 | A | 1/1991 | Peppel et al. | |
| 5,133,578 | A | 7/1992 | Whightsil, Sr. et al. | |
| 5,269,629 | A | 12/1993 | Langner | |
| 5,482,406 | A | 1/1996 | Arlt, III | |
| 5,615,977 | A | 4/1997 | Moses et al. | |
| 5,641,248 | A | 6/1997 | Arlt, III | |
| 5,791,695 | A | 8/1998 | Snider | |
| 5,905,212 | A | 5/1999 | Moses et al. | |
| 5,951,061 | A | 9/1999 | Arlt, III et al. | |
| 6,739,804 | B1 | 5/2004 | Haun | |
| 6,789,790 | B2 | 9/2004 | Speckhart et al. | |
| 7,063,292 | B2 | 6/2006 | Perez-Sanchez | |
| 7,167,412 | B2 | 1/2007 | Tenghamn | |
| 7,341,283 | B2 | 3/2008 | Moses et al. | |
| 7,529,089 | B2 | 5/2009 | Cheng | |
| 2009/0156341 | A1 | 6/2009 | Gaynor | |
| 2009/0212557 | A1 | 8/2009 | Gutierrez-Lemini et al. | |

OTHER PUBLICATIONS

"SCR Sizes," Internet web page at oilstates.com, 2007, one page, Oil States Industries, Inc., Arlington, Tx.

"SCR Features," Internet web page at oilstates.com, 2007, one page, Oil States Industries, Inc., Arlington, Tx.

"Tendon Systems," Internet web page at oilstates.com, 2007, one page, Oil States Industries, Inc., Arlington, Tx.

"FlexJoint Tendon Bearing," Internet web page at oilstates.com, 2007, one page, Oil States Industries, Inc., Arlington, Tx.

"SCR Key Slot Receptacle," Internet web page at oilstates.com, 2007, one page, Oil States Industries, Inc., Arlington, Tx.

International Search Report, International Application No. PCT/US2009/035031, Jun. 25, 2009, 4 pages. European Patent Office, Rijswijk, The Netherlands.

Written Opinion of the International Searching Authority, International Application No. PCT/US2009/035031, Jun. 25, 2009, 6 pages. European Patent Office, Munich, Germany.

Benenson, Walter, et al., Handbook of Physics, pp. 54-55, 2002, Springer-Verlag New York inc., New York, NY.

Cha, Philip D., et al., Fundamentals of Modeling and Analyzing Engineering Systems, pp. 29-33, 2000, Cambridge University Press, Cambridge, UK.

Lobontiu, Nicolae, et al., Mechanics of Micromechanical Systems, pp. 271-272, 2005, Kluwer Academic Publishers, Springer Science +Business Media, Inc., New York, NY.

Supplemental Instructions Torsion Spring Installation, 4 pages, Jun. 28, 2004, Clopay Building Products, Griffon Corporation, New York, NY.

ZBD6890K11—GE Monogram Fully Integrated Built-In Dishwasher, 4 pages, Oct. 2006, General Electric Company, Fairfield, CT.

Webster's Seventh New Collegiate Dictionary, pp. 610-611, 723, 792, 1965, G. & . C. Merriman Company, Springfield, MA.

John Anderson & Dennis Gay, "Physics Lab Module 4, Series and Parallel DC Circuits," Apr. 5, 2009, pp. 4-1 to 4-12, University of North Florida, Jacksonville, Florida.

Igor Glozman, "Heat Transfer," Physics class notes, Feb. 11, 2011, 3 pages, Highline Community College, DesMoines, Washington.

Webster's Seventh New Collegiate Dictionary, 1965, pp. 191, 303, and 780 G. & C. Merriam Co., Springfield, Mass.

* cited by examiner

PRESSURE ISOLATION SYSTEM FOR FLEXIBLE PIPE JOINTS

RELATED APPLICATIONS

The present application is a continuation-in-part of Danton Gutierrez-Lemini, et al., U.S. patent application Ser. No. 12/036,738 filed Feb. 25, 2008, entitled "Two-Element Tandem Flexible Pipe Joint," incorporated herein by reference.

FIELD OF THE INVENTION

The present invention relates to a flexible pipe joint having an extension pipe extending from a housing, and at least one annular elastomeric flex element for mounting the extension pipe to the housing for permitting angular displacement of the extension pipe with respect to the housing.

BACKGROUND OF THE INVENTION

Flexible joints having an annular elastomeric flex element mounting an extension to a housing are used for reducing motion-induced stresses between floating offshore facilities and risers and tendons depending from the floating offshore facilities. Typically the flex element consists of alternating spherical shims of metal, or other stiff material, and layers of elastomeric material. Such a flex element is capable of providing a free angular displacement of about ±15 degrees or more while supporting an axial tension proportional to the size of the flex element. Typically the size of the flex element has been selected to handle the desired load upon the riser or tendon, and flex elements have been manufactured and stocked in various sizes for handling various standard sizes of risers or tendons.

Risers are used for transfer of production fluids from the sea floor up to a deck of a floating offshore vessel, and for transfer of the production fluid off the vessel to one or more export lines. The loads impressed by the riser on a flex element typically consist of tension in the riser, angular displacement and rotation of the riser, internal pressure in the production fluid, and increased temperature from the production fluid. Thus, the internal pressure in the production fluid, and increased temperature from the production fluid, may make the selection of a flex element for a riser more difficult than the selection of a flex element for a tendon.

For various applications, flexible pipe joints have incorporated more than one flex element in a common housing. For example, a double-ended flexible pipe joint for a riser has a first flex element in the housing for mounting a first extension pipe to the housing, and a second flex element in the housing for mounting a second extension pipe to the housing. The two extension pipes extend in opposite directions from the common housing. In this fashion, the double-ended flexible pipe joint can accommodate twice the angular displacement than can be tolerated by a single-ended flexible pipe joint having a single flex element. The angular displacement is divided between the two flex elements in the double-ended flexible pipe joint, but each of the two flex elements carries the same full tension of the riser. Examples of such double-ended flexible pipe joints are found in Herbert et al. U.S. Pat. No. 3,680,895 issued Aug. 1, 1972; Herbert et al. U.S. Pat. No. 4,068,864 issued Jan. 17, 1978 (see FIG. 4); and Whightsil, Sr. et al. U.S. Pat. No. 5,133,578 issued Jul. 28, 1992.

Flexible pipe joints have incorporated more than one flex element in a common housing so that two flex elements are subjected to the same angular displacement yet only one of these two flex elements carries the tensile load upon the flexible pipe joint. Such an arrangement may reduce pressure from production fluid on each flex element and provide both a primary and a backup sealing mechanism for containing the pressurized production fluid within the pipe joint. However, the flex elements in these concepts need to be pre-compressed for proper functioning; a fact that reduces the usable life of the flex elements. Thus, these designs make an inefficient use of the two flex elements both to carry the axial load upon the pipe and to seal the pressure. Examples of such flexible pipe joints are found in Schwemmer U.S. Pat. No. 4,183,556 issued Jan. 15, 1980; Ohrt U.S. Pat. No. 4,068,868 issued Jan. 17, 1978; Peppel et al. U.S. Pat. No. 4,784,410 issued Nov. 15, 1988; and Peppel et al. U.S. Pat. No. 4,984,827 issued Jan. 15, 1991.

A pipe joint having two flex elements in a common housing and different levels of axial pre-compression upon the two flex elements is disclosed in Lamy et al. U.S. Pat. No. 4,416,473 issued Nov. 23, 1983. The two flex elements are arranged on opposite sides of a common center of rotation. The pipe joint has a flange and a collar forming a spherical bearing permitting angular displacement but preventing relative movement under axial compression. (Lamy, col. 5, lines 2-8.) One flex element having a larger diameter takes up axial tensile loads. The other flex element having a smaller diameter is designed to ensure solely the sealing of the fluid within the pipe. (Lamy, col. 5 lines 16-34.) A desired axial pre-stress is applied to the flex element having the smaller diameter by pulling bolts up tighter to close a clearance of a cylindrical opening. (Lamy, col. 6, lines 30-46.)

SUMMARY OF THE INVENTION

For handling high fluid pressure within a flexible pipe joint, it is desired for the flexible pipe joint to include at least one primary elastomeric flex element for handling axial loads upon the pipe joint, and at least one secondary elastomeric flex element especially designed for containing the fluid pressure within the flexible pipe joint and reducing or eliminating fluid pressure upon the primary flex element. By reducing or eliminating fluid pressure upon the primary flex element, the size of the primary flex element can be reduced, and its lifetime can be extended. However, a reduction in the size of the primary flex element should not require a significant increase in the overall size of the flexible joint to accommodate the secondary elastomeric flex element. Therefore it is desired to provide more compact secondary flex elements most suitable for particular flexible pipe joint configurations.

There are a variety of flexible pipe joint configurations that have a limited range of axial displacement for their intended use. This limited range of axial displacement can be due to the specific flexible pipe joint configuration or due to the particular use of the flexible pipe joint. Very often the limited range of axial displacement is compatible with a secondary flex element designed especially for containing fluid pressure so that the secondary flex element will not be subjected to excessive axial displacement. In this case it is desired to provide a very compact pressure isolation system that can be assembled easily into the flexible pipe joint configuration without substantial modification of the flexible pipe joint configuration. Therefore it is possible to increase the load handling capability or lifetime of various kinds of flexible pipe joint configurations.

It is also desired to provide a flexible pipe joint configuration especially designed to accommodate secondary flex elements. Such a flexible pipe joint configuration can handle increased pressure, temperature, and axial loads for a given service life and a given size of the housing or footprint of the housing.

In accordance with a first aspect, the invention provides a flexible pipe joint including a housing, an extension pipe extending from the housing, a first annular elastomeric flex element disposed in the housing, a second annular elastomeric flex element disposed in the housing, and a third annular elastomeric flex element disposed in the housing. The first, second, and third flex elements have a common center of rotation, the first and second flex elements are stacked in a coaxial fashion on opposite sides of the common center of rotation, the first and second flex elements are disposed from the common center of rotation by a common inner radius, and the third flex element is disposed from the common center of rotation by an outer radius greater than the inner radius. The first and second flex elements are mechanically joined in series between the housing and the extension pipe, and the third flex element is mechanically joined to the housing and the extension pipe in parallel with the series combination of the first and second flex elements.

In accordance with a second aspect, the invention provides a flexible pipe joint including a housing having a first end and a second end, an attachment flange mounted at the first end of the housing, an extension pipe extending from the second end of the housing, and an inner pipe disposed within the housing and mounted to the attachment flange and providing a channel from an aperture in the attachment flange to the extension pipe. The extension pipe has an inner flange and an outer jacket. The flexible pipe joint also includes a centering ring disposed within the housing, and the inner pipe has a flange within the centering ring, and the inner flange of the extension pipe is disposed within the centering ring. A portion of the centering ring is disposed between the inner flange of the extension pipe and the outer jacket of the extension pipe. The flexible pipe joint further includes a first annular elastomeric flex element disposed within the housing between the centering ring and the inner flange of the extension pipe, a second annular elastomeric flex element disposed within the housing between the centering ring and the flange of the inner pipe, and a third annular elastomeric flex element disposed within the housing between the housing and the outer jacket of the extension pipe for mounting the extension pipe to the housing for angular displacement of the extension pipe with respect to the housing. The extension pipe passes through the third flex element so that the third flex element encircles the extension pipe. The centering ring couples the first and second flex elements mechanically in series between the extension pipe and the housing so that an angular displacement of the extension pipe with respect to the housing causes an angular displacement of the centering ring with respect to the housing that is about half of the angular displacement of the extension pipe with respect to the housing, and axial tension upon the extension pipe with respect to the housing places each of the first, second, and third flex elements in compression.

In accordance with a third aspect, the invention provides a flexible pipe joint including a housing having a first end and a second end, an attachment flange mounted at the first end of the housing, a support ring mounted at the second end of the housing, an extension pipe extending from the second end of the housing, and an inner pipe disposed within the housing and welded to the attachment flange and providing a channel from an aperture in the attachment flange to the extension pipe. The flexible pipe joint also includes a spherical centering ring disposed within the housing. The extension pipe has an inner flange and an outer jacket, and the inner pipe has an inner flange and an outer jacket. The inner flange of the extension pipe is disposed within the centering ring, and the inner flange of the inner pipe is disposed within the centering ring. The flexible pipe joint also includes a first annular elastomeric flex element disposed within the housing between the centering ring and the inner flange of the extension pipe, and elastomer of the first flex element is bonded to the centering ring and bonded to the inner flange of the extension pipe. The flexible pipe joint also includes a second annular elastomeric flex element disposed within the housing between the centering ring and the inner flange of the inner pipe, and elastomer of the second flex element is bonded to the centering ring and bonded to the inner flange of the inner pipe. The flexible pipe joint also includes a third annular elastomeric flex element disposed within the housing between the support ring and the outer jacket of the extension pipe, and elastomer of the third flex element is bonded to the support ring and bonded to the outer jacket of the extension pipe. The third flex element mounts the extension pipe to the housing for angular displacement of the extension pipe with respect to the housing, and the extension pipe passes through the third flex element so that the third flex element encircles the extension pipe. The flexible pipe joint further includes a load ring secured to the outer jacket of the extension pipe, and a fourth annular elastomeric flex element disposed within the housing between the load ring and the outer jacket of the inner pipe. Elastomer of the fourth flex element is bonded to the load ring and bonded to the outer jacket of the inner pipe, and the inner pipe passes through the fourth flex element so that the fourth flex element encircles the inner pipe.

In accordance with a fourth aspect, the invention provides a flexible pipe joint including a housing, an attachment flange mounted at first end of the housing, a support ring mounted at a second end of the housing, an inner pipe attached to the attachment flange, and an extension pipe extending from the second end of the housing. The flexible pipe joint further includes a first inner liner disposed in and welded to the inner pipe, a second inner liner disposed in and welded to the extension pipe, a centering ring, a first annular elastomeric flex element disposed in the housing and mounted between the first inner liner and the centering ring, a second annular elastomeric flex element disposed in the housing and mounted between the second inner liner and the centering ring, and a third annular elastomeric flex element disposed in the housing and mounted between the extension pipe and the support ring. The first, second, and third flex elements have a common center of rotation, the first and second flex elements are stacked in a coaxial fashion on opposite sides of the common center of rotation, the first and second flex elements are disposed from the common center of rotation by a common inner radius, and the third flex element is disposed from the common center of rotation by an outer radius greater than the inner radius.

In accordance with a final aspect, the invention provides a flexible pipe joint including a housing, an extension pipe extending from the housing, a first annular elastomeric flex element disposed in the housing, a second annular elastomeric flex element disposed in the housing, a third annular elastomeric flex element disposed in the housing and a fourth elastomeric bearing disposed in the housing. The first, second, third and fourth flex elements have a common center of rotation. The first and second flex elements are stacked in a coaxial fashion on opposite sides of the common center of rotation and the first and second flex elements are disposed from the common center of rotation by a common inner radius. Similarly, the third and fourth flex elements are stacked in a coaxial fashion on opposite sides of the common center of rotation and are disposed from the common center of rotation by an outer radius greater than the inner radius. The first and second flex elements are mechanically joined in series between the housing and the extension pipe, and the third and fourth flex elements are mechanically joined in parallel to each other and mechanically joined to the housing and the extension pipe thus being joined in parallel with the series combination of the first and second flex elements.

BRIEF DESCRIPTION OF THE DRAWINGS

Additional features and advantages of the invention will be described below with reference to the drawings, in which.

Figure 1:
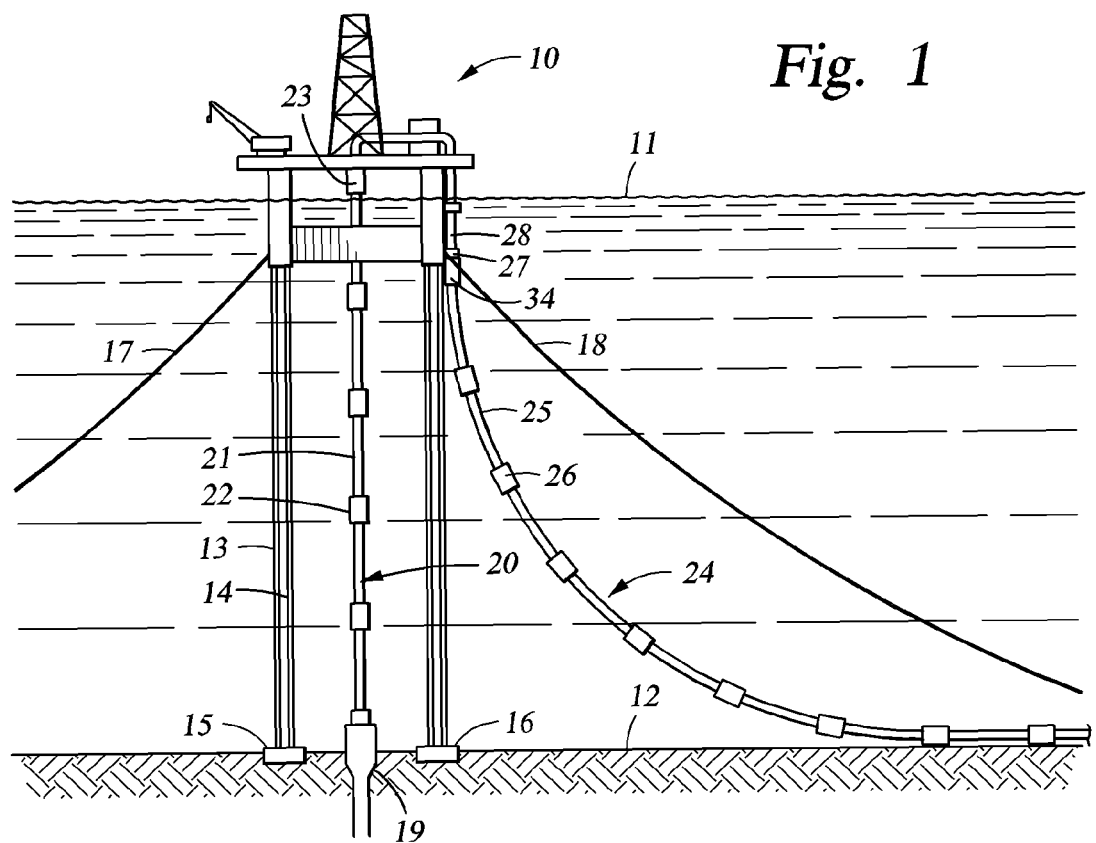
FIG. 1 is a schematic diagram of a tension leg platform (TLP) including a production riser and an export riser in a catenary configuration.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown an offshore drilling and production vessel generally designated 10 floating on a water surface 11. The floating vessel in particular is a tension leg platform (TLP) secured to the seabed 12 by means of tendons 13, 14 and foundation templates 15, 16. Although not visible in FIG. 1, there is a set of tendons depending from each of four corners of the TLP platform 10 to a respective one of four foundation templates 15, 16. In addition, each of the four lower corners of the TLP platform 10 is secured by a respective lateral mooring line 17, 18 used to move the platform laterally and to resist lateral storm loadings.

For conveying drilling fluids and a drill string from the TLP to a well bore 19 in the seabed 12, and for removing hydrocarbons from the well when drilling has been completed, a production riser generally designated 20 extends from the well bore 19 up to the TLP 10. The riser 20 consists of a number of rigid pipe sections 21 joined by flexible pipe joints 22. A suitable flexible pipe joint is described, for example, in Whightsil, Sr. et al. U.S. Pat. No. 5,133,578 issued Jul. 28, 1992, incorporated herein by reference.

Also shown in FIG. 1 is an export riser generally designated 24 hanging from a leg of the TLP 10 in a catenary configuration and touching down on the seabed 12. The export riser 24, for example, is a pipeline from the TLP 10 to an on-shore facility (not shown), or to a buoy system for loading floating production storage and offloading vessels (FPSO's). The export riser 24 is similar to the production riser 20 in that it is comprised of a number of rigid pipe sections 25 joined by elastomeric flexible pipe joints 26. A flexible pipe joint 27 at the top of the riser 24 is mounted in a side entry slotted receptacle 34 attached to a leg of the TLP 10.

Figure 2:
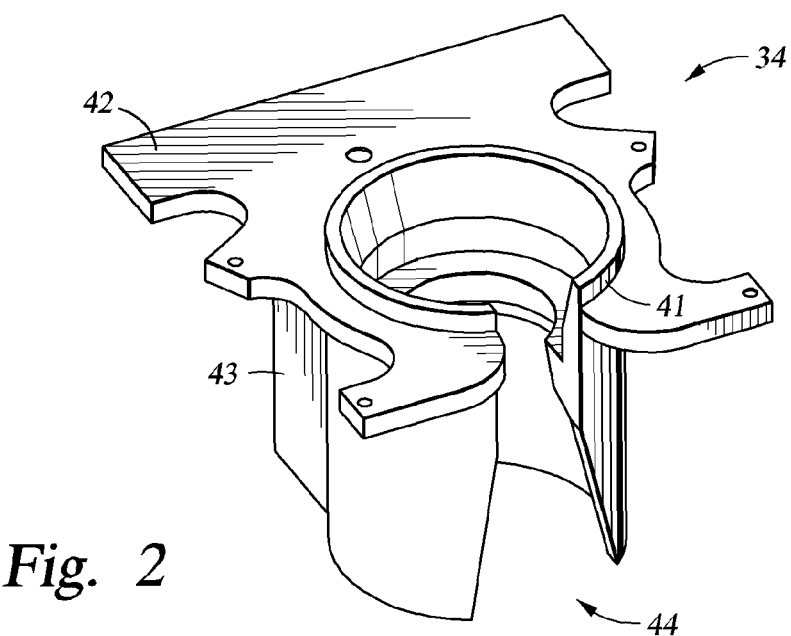
FIG. 2 is a side entry slotted receptacle for mounting the export riser to the TLP in FIG. 1.

FIG. 2 shows the side entry slotted receptacle 34. The receptacle 34 is a weldment consisting of a forged, machined load ring 41 and a number of plates 42, 43. The plates 42, 43, performing as webs and flanges, serve to stabilize the load ring 41 as well as bridge loads between the TLP leg and the export riser.

During installation, the rear portion of the receptacle 34 is welded or otherwise secured to the leg of the TLP, and the upper flexible pipe joint of the export riser is inserted into the load ring 41. The receptacle includes a front slot generally designated 44 for ease of side entry of the export riser during installation.

Flexible joints for risers and for mounting tendons to a TLP have been manufactured and stocked in various sizes for handling various standard sizes of risers or tendons. However, situations may arise where it would be desirable to increase the load bearing capacity or useable lifetime of a flexible joint for a given housing size or footprint. This is especially true for the uppermost flexible pipe joint of a riser, because this flexible joint is typically mounted to a floating vessel having a mounting receptacle matched to a particular housing footprint.

For example, initially a mounting receptacle is selected and sized for anticipated service conditions, and then the mounting receptacle is welded to the floating vessel. If the service conditions would change, then it may be difficult to replace the mounting receptacle and expensive to install a new mounting receptacle. The loading conditions may need to be increased because a new or deeper well has been drilled at an existing site so that higher temperature production fluid is to be extracted at the existing site, or the loading conditions may need to be increased because production at an existing site has been terminated and the floating vessel has been moved to a new site where the seabed is deeper so that the flexible pipe joint must handle a higher tension. In either case, it would be desirable to install a new, higher capacity flexible pipe joint in the existing mounting receptacle.

Figure 3:
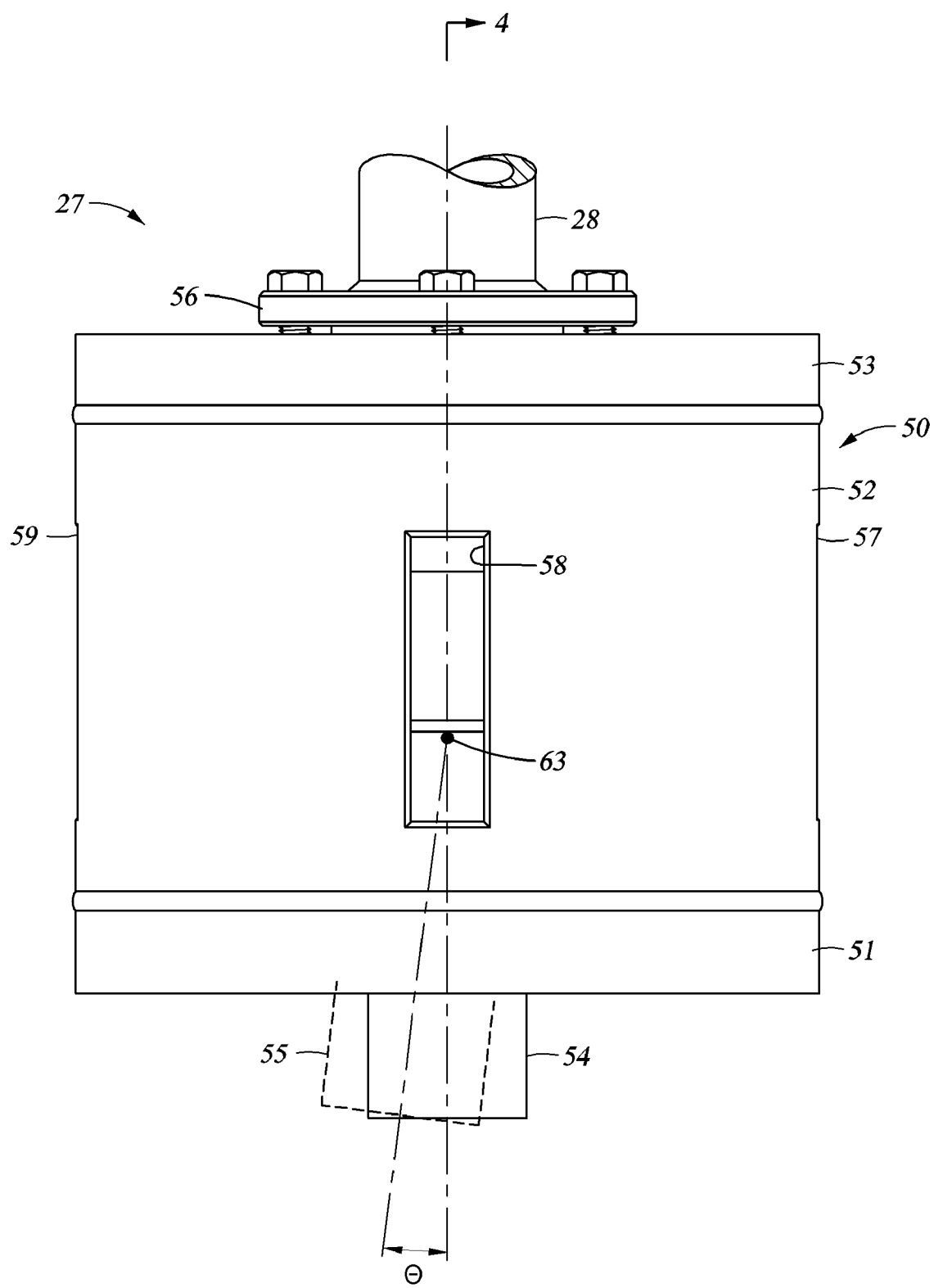
FIG. 3 is a front view of the flexible pipe joint introduced in FIG. 1.

FIG. 3 shows the flexible pipe joint 27 in greater detail. In this specific embodiment, the flexible pipe joint 27 has an outer housing 50 and an extension pipe 54 extending from the outer housing 50. The outer housing includes a lower support ring 51, a cylindrical body 52, and an atttachment flange 53. For example, these components are made of a corrosion resistant steel alloy. The cylindrical body 53 has a series of cooling ports 57, 58, 59 spaced about its circumference to permit circulation of seawater for removal of heat from the flexible pipe joint when high temperature fluid is conveyed though the flexible pipe joint.

When in use, the flexible pipe joint 27 is seated into a captive receptacle (34 in FIG. 2) that can support securely the weight and load of the flexible pipe joint 27. The attachment flange 53 is bolted to a flange (56 in FIG. 3) of a pipe segment (28 in FIG. 3) for conveying fluid through the flexible pipe joint between the pipe segment 28 and the extension pipe 54. When supporting a tensile load upon the extension pipe 54 with respect to the outer housing 50, the flexible pipe joint 27 permits a range of angular displacement (θ) of the extension pipe 54 with respect to the outer hosing 50. For example, as shown in FIG. 3, an angular displacement (θ) of the extension pipe 54 occurs when the extension pipe rotates about a center of rotation 63 from a vertical orientation as shown in solid lines to an inclined orientation 55 shown in dashed lines.

To increase the load bearing capacity or useable lifetime of a flexible joint for a given housing size or footprint, one or more primary flex elements and one or more secondary flex elements are included in a common housing. The primary flex elements handle axial loads upon the pipe joint, and the secondary elastomeric flex elements contain fluid pressure within the flexible pipe joint. In particular, the primary elastomeric flex elements ensure that typical axial loads upon the pipe joint do not cause axial displacement that is excessive for the secondary elastomeric flex elements, and the secondary flex elements reduce or eliminate fluid pressure upon the primary flex element. In addition, the secondary flex elements may have a compact size so that the overall size of the flexible pipe joint need not be increased to accommodate the secondary elastomeric flex elements.

Figure 4:
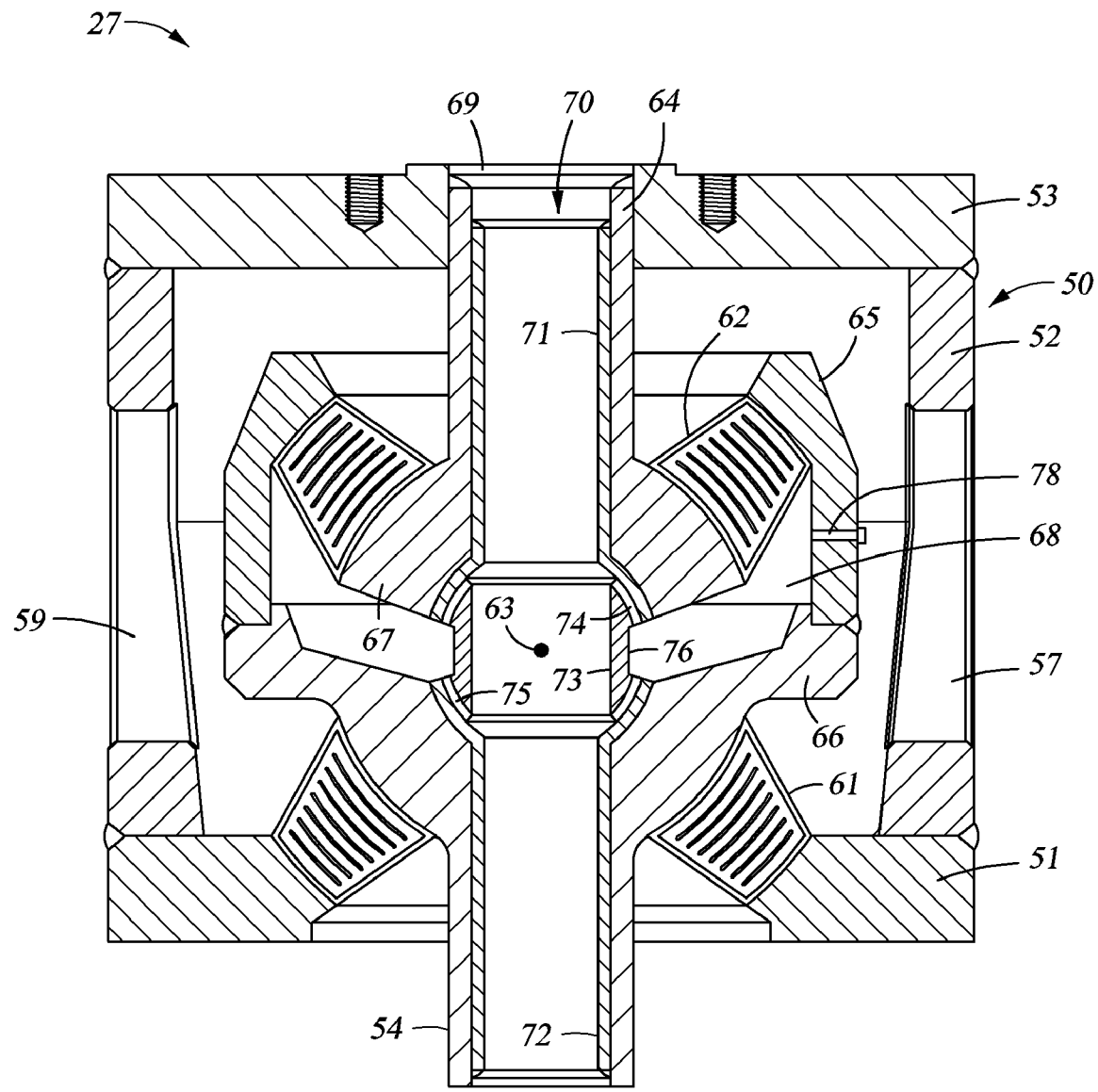
FIG. 4 is a lateral cross-section of the flexible pipe joint along line 4-4 in FIG. 3.

FIG. 4 shows one preferred configuration including a lower primary flex element 61 and an upper primary flex element 62. The primary flex elements 61 and 62 are stacked in a coaxial fashion about a common center of rotation 63 and coupled to the extension pipe 54 and the lower support ring 51 to react in parallel to rotation of the extension pipe 54 about the common center of rotation and to axial displacement of the extension pipe 54. In this specific embodiment, the flexible pipe joint 27 has an inner housing 65 welded to an upper flange 66 of the extension pipe 54, and an inner pipe 64 welded to the attachment flange 53. For example, the inner housing 65 and the inner pipe 64 are made of a corrosion resistant steel alloy. The lower primary flex element 61 is disposed between and bonded to the lower support ring 51 and the upper flange 66 of the extension pipe 54. The upper primary flex element 62 is disposed between and bonded to a lower flange 67 of the inner pipe 64 and the inner housing 65.

In general, because the extension pipe 54 and the inner housing 65 are joined together, the upper primary flex element 62 and the lower primary flex element 61 are forced to react in parallel and to thus displace and rotate by the same amount. Therefore, the total load due to riser tension and rotation is distributed between the upper flex element 62 and the lower flex element 61 in proportion to their relative stiffnesses. The lower flex element 61 transfers its load directly into the lower support ring 51, while the upper flex element 62 transfers its load into the inner pipe 64. The inner pipe 64 then transfers that load into the attachment flange 53 through a welded connection. The attachment flange 53 transfers that load through another welded connection down to the lower support ring 51.

The flexible pipe joint 27 further includes an upper inner liner 71, a lower inner liner 72, and a centering ring 73. An upper secondary annular elastomeric flex element 74 is disposed between the centering ring 73 and the upper inner liner 71, and a lower secondary annular elastomeric flex element 75 is disposed between the centering ring 73 and the lower inner liner 72. The assembly of the upper inner liner 71, the lower inner liner 72, the centering ring 73, the upper secondary annular elastomeric flex element 74, and the lower secondary annular elastomeric flex element 75, is molded together as a single unit, generally designated 70, as further described below with reference to FIGS. 6 and 7.

All of the flex elements 61, 62, 74, 75 of the flexible pipe joint 27 share the same center of rotation 63 so as to allow a range of unbinding angular displacement of the extension pipe 54 during operation. The centering ring 73 is a spherical ring having a center point that coincides with this common center of rotation 63. The centering ring 73 also has a notch 76 about its equator.

The secondary flex elements 74, 75, the centering ring 73, the upper liner 71, and the lower liner 72 isolate an inner cavity 68 from the production fluid. This, in turn, eliminates the resultant pressure head that would otherwise be introduced if the production fluid pressure were allowed into the inner cavity 68 and over to the primary flex elements 61 and 62. Thus, the assembly of the liners 71, 72 and the centering ring 73 and the secondary flex elements 74, 75 functions as a pressure-isolation unit 70, which creates a redundancy in the seals between the production fluid and the ambient conditions outside of the flexible pipe joint 27. The inner housing 65, for example, has a pressure port 78 for measuring or adjusting the pressure in the inner cavity. The pressure port 78, for example, includes a hole through the inner housing 65, and this hole is capped with a plug, valve, or pressure gauge accessible externally through the cooling port 57.

In use, when transferring production fluid from the floating vessel to the export riser (24 in FIG. 1), the production fluid flows down through an aperture 69 in the attachment flange 53 into the inner pipe 64. Then the production fluid flows from the inner pipe 64 down through upper inner liner 71, through the centering ring 73, thought the lower inner liner 72, and through the extension pipe 54.

It is also possible to use a flexible pipe joint as shown in FIG. 4 in the production riser (20 in FIG. 1). In this case, the production fluid from the well bore would flow up through the extension pipe 54, and then up through the lower inner liner 72, the centering ring 73, the upper inner liner 71, the inner pipe 64, and up through the aperture 69 of the attachment flange 53.

Construction of the flexible pipe joint 27 requires two primary flex joint assemblies to be molded separately. In one molding process, elastomer of the lower flex element 61 is bonded to the lower support ring 51 and to the extension pipe 54 using a split two-piece ring (not shown). When this molding process is completed, the two pieces of the split ring are taken apart from each other to remove the split ring from the molded assembly. Further details regarding a mold with such a split ring are found in FIG. 5 and column 5 line 47 to column 6 line 2 of McGregor U.S. Pat. No. 4,708,758 issued Nov. 24, 1987, incorporated herein by reference.

In a similar fashion, when the upper flex element 62 is molded, elastomer of the upper flex element is bonded to the lower flange 67 of the inner pipe 64 and to the inner housing 65. In this case, however, there is no need for a split ring because the shapes of the inner pipe 64 and the inner housing 65 permit a solid conical ring to be used in the molding process.

The flexible pipe joint as shown in FIG. 4 is manufactured from the assembly of the lower flex element 61 and the assembly of the upper flex element 62 by inserting the lower inner liner 72 of the liner assembly into the extension pipe 54. Then the assembly of the upper primary flex element 62 is lowered into position with the inner pipe 64 fitted over the upper liner 71 of the liner assembly so that the upper liner 71 is inserted into the inner pipe 64 until the inner housing 65 becomes seated upon the upper flange 66 of the extension pipe 54. Then the inner housing 65 is welded to the upper flange 66 of the extension pipe 54. Then the lower end of the lower inner liner 72 is welded to the lower end of the extension pipe 54, and the upper end of the upper inner liner 71 is welded to the upper end of the inner pipe 64. Then the cylindrical body 52 is placed upon and welded to the lower support ring 51. Then the attachment flange 53 is fitted on the inner pipe 64 and placed upon the cylindrical body 52, and the upper end of the inner pipe is welded to the attachment flange. Then the attachment flange 53 is welded to the cylindrical body 52.

Figure 5:
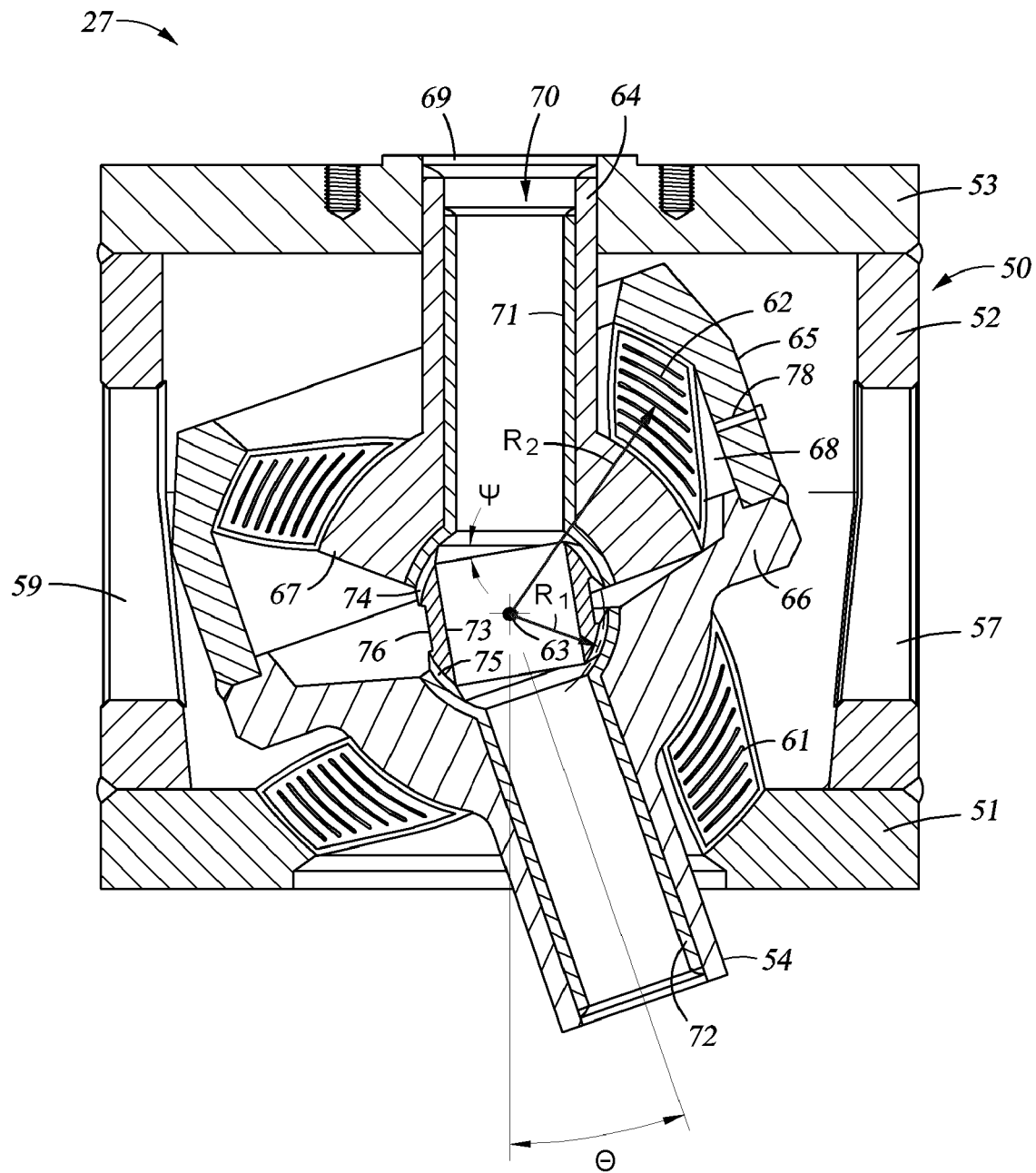
FIG. 5 shows the flex elements in FIG. 4 reacting to an angular deflection of the extension pipe of about 20 degrees.

FIG. 5 shows the flexible pipe joint 27 when the extension pipe 54 has been subjected to a maximum angular displacement ($\theta$). The centering ring 73 also rotates about the center of rotation 63, but its angular displacement ($\phi$) is about half the angular displacement ($\theta$) of the extension pipe 54. Therefore, by mechanically joining the upper secondary flex element 74 and the lower secondary flex element 75 in series between the housing 50 and the extension pipe 54, the angular displacement of each of the secondary flex elements caused by the angular displacement ($\theta$) of the extension pipe is about half the angular displacement ($\theta$) of the extension pipe.

In general, the angular deformation of a flex element is directly proportional to the angular displacement 0 of the extension pipe and directly proportional to the ratio of the radial displacement of the flex element from the center of rotation 63 divided by the radial thickness of the flex element. As shown in FIG. 5, for example, each of the secondary flex elements 74, 75 is displaced by a common inner radius $R_1$ from the common center of rotation 63, and each of the primary flex elements 61, 62 is displaced by a common outer radius $R_2$ from the common center of rotation 63. Because the outer radius $R_2$ is much larger than the inner radius $R_1$ and because the secondary elements 74, 75 are mechanically connected in series and the primary flex elements 61, 62 are mechanically connected in parallel between the housing and the extension pipe, each of the secondary flex elements may have a radial thickness that is much smaller than the radial thickness of each of the primary flex elements, so that the pressure isolation unit 70 can have a compact size.

It is also possible for each the secondary flex elements 74, 75 to be comprised of an elastomer having a lower modulus than the elastomer of each of the primary flex elements 61, 62, because the secondary flex elements 74, 75 are designed primarily for containing pressure, and the primary flex elements 61, 62 are designed primary for resisting angular and axial deformation. By using a lower modulus elastomer composition in the secondary flex elements 74, 75 than the primary flex elements 61, 62, the secondary flex elements may tolerate a greater angular deformation than the primary flex elements, and therefore the radial thickness of the secondary flex elements can be further reduced relative to the radial thickness of the primary flex elements. However, as further described below with reference to FIGS. 14 and 15, it is also possible to construct flexible pipe joints in which the primary and secondary flex elements have similar shapes and the same elastomer composition and in which the secondary flex elements may be subjected to greater pressure and temperature than the primary flex elements.

Figure 6:
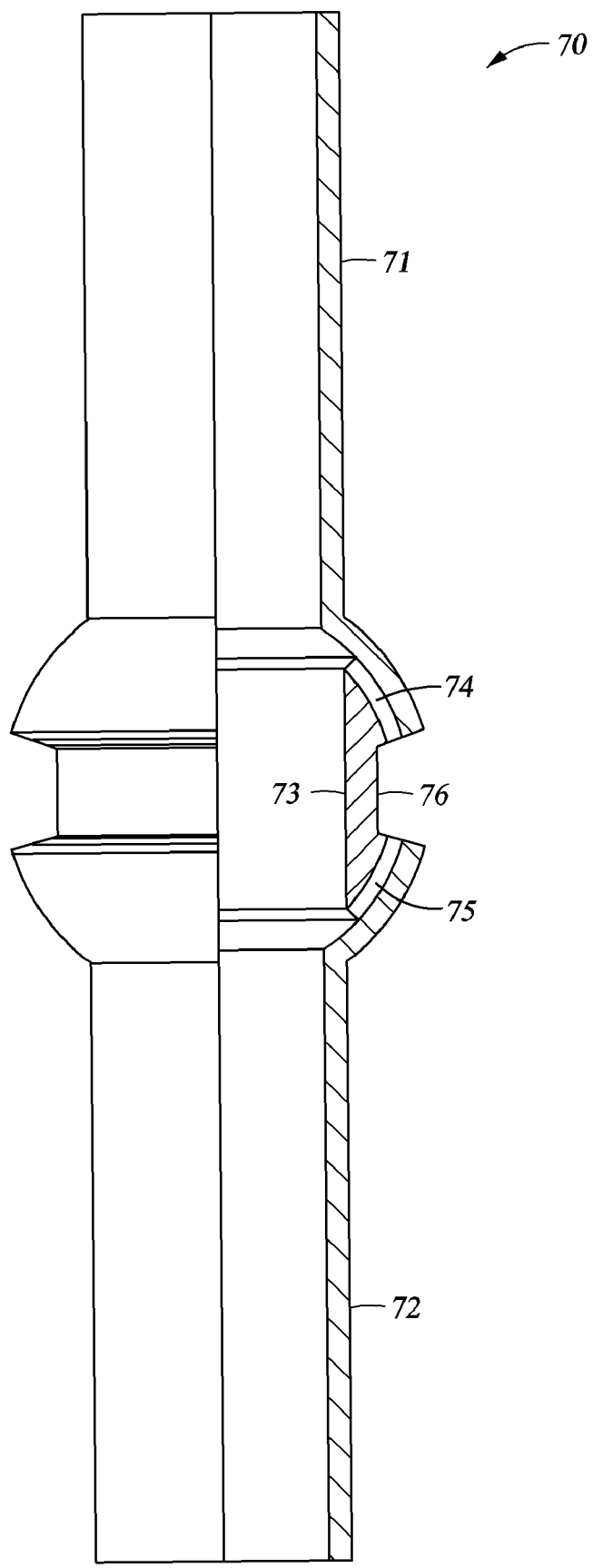
FIG. 6 shows a secondary flex element assembly in FIG. 4 separate from the other components of the flexible pipe joint.

FIG. 6 shows the pressure isolation unit 70 apart from any particular flexible pipe joint in which it may be used. In general, each of the upper liner 71 and the lower liner 72 has a cylindrical portion away from the centering ring 73, and a hemispherical shape near to the centering ring. The cylindrical portion of each of the upper liner 71 and the lower liner 72 has a length dependent on the particular flexible pipe joint configuration. In general, the length of the cylindrical portion of a liner is selected for convenient welding of the extreme end of the liner to another metal component of the flexible pipe joint such as the extension pipe or an inner pipe.

Figure 7:
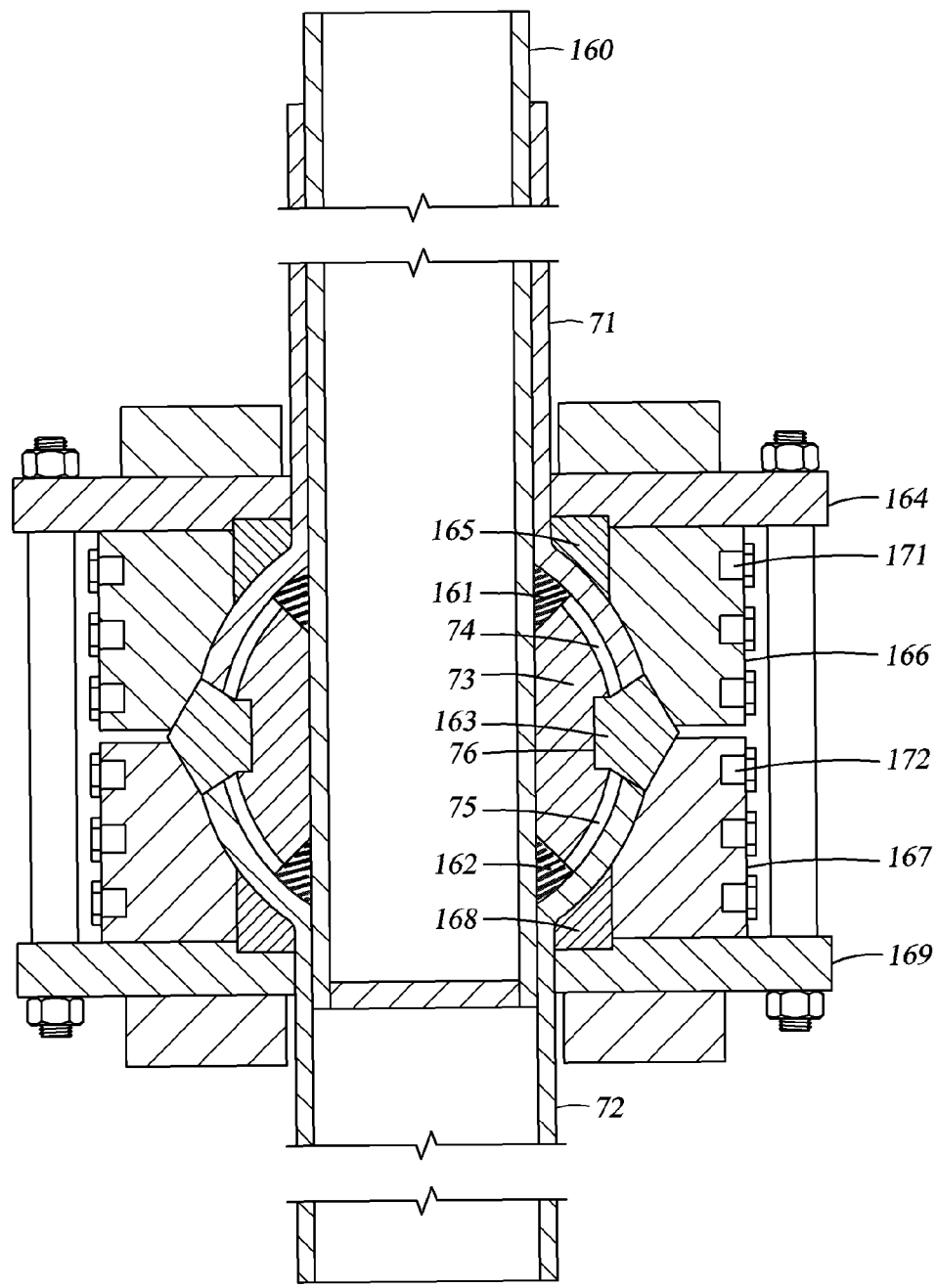
FIG. 7 shows the secondary flex element assembly of FIG. 6 in a mold during molding of the secondary flex elements.

FIG. 7 shows a compression mold for molding the pressure isolation unit 70 of FIG. 6. In FIG. 7, the compression mold has both inside and outside components. The inside components are an internal diameter mandrel or inflatable bladder 160, and a pair of collapsible or removable elastomer insert rings 161, 162. The insert rings 161, 162 are pre-molded from elastomer and are cured, and then coated with a mold release agent. The insert rings 161, 162 are dimensioned to act as a dam or stopper for the uncured rubber that becomes the upper secondary flex element 74 and the lower secondary flex element 75. The outside components include an exterior mold ring 163 that is inserted into the equatorial notch 76 of the centering ring 73 to hold the components (71, 72, 73, 74, 75) of the pressure isolation unit at a pre-set height. The outside components also include a series of clamping rings 164, 165, 166, 167, 168, 169. The external clamping rings 166, 167 have steam jackets 171, 172 for heating the mold to cure the rubber of the upper secondary flex element 74 and the lower secondary flex element 75.

Figure 8:
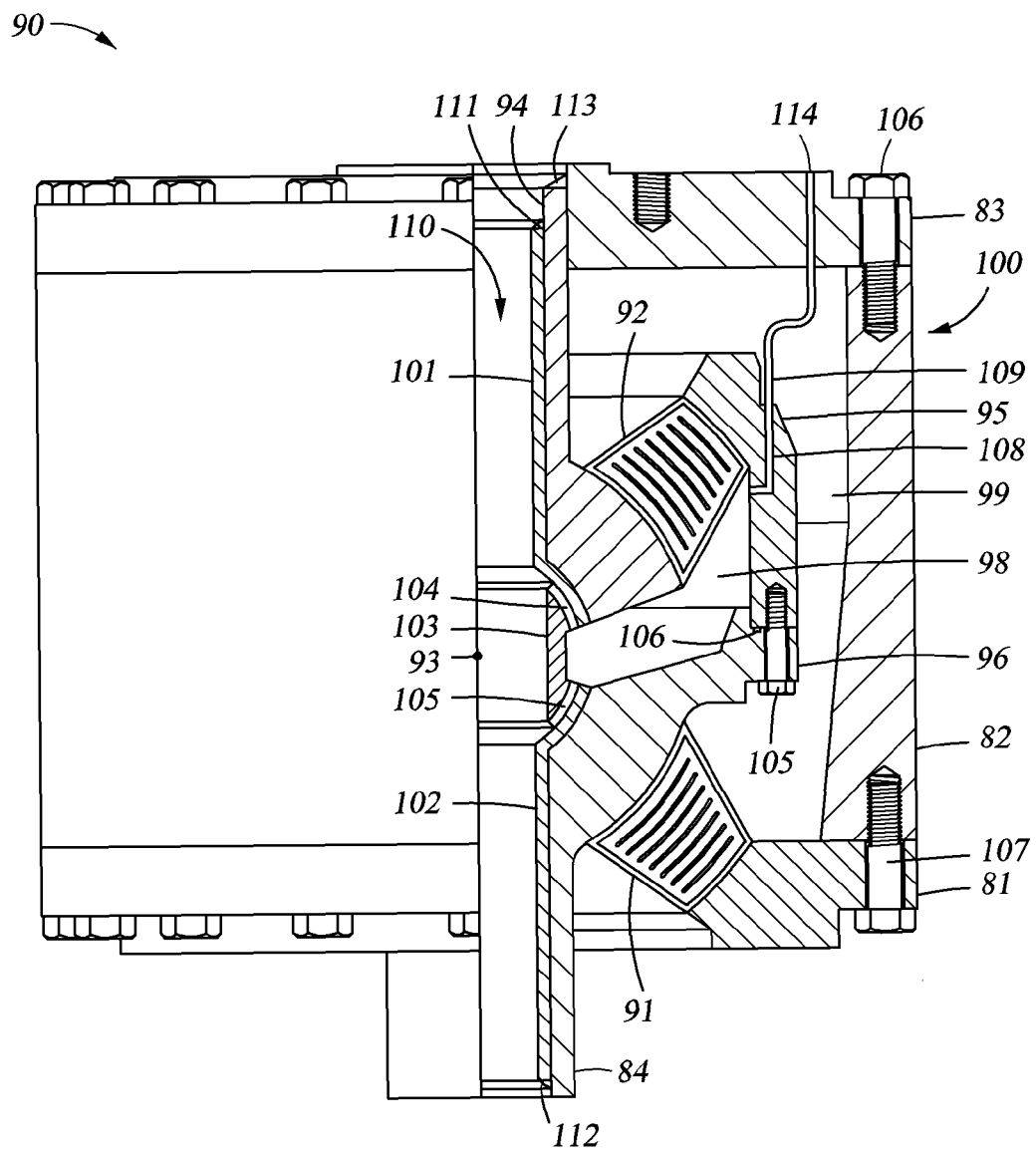
FIG. 8 shows an alternative construction of the flexible pipe joint of FIG. 4 to facilitate disassembly and replacement of the secondary flex element assembly.

FIG. 8 shows an alternative construction for a flexible pipe joint 90 to facilitate disassembly. The flexible pipe joint 90 includes an outer housing 100 and an extension pipe 84 extending from the outer housing. The outer housing 100 is comprised of a lower support ring 81, a cylindrical body 82, and an attachment flange 83. The flexible pipe joint 90 further includes an extension pipe 84, a lower primary elastomeric flex element 91, an upper primary elastomeric flex element 92, an inner pipe 94, an inner housing 95, an upper liner 101, a lower liner 102, a centering ring 103, an upper secondary elastomeric flex element 104, and a lower secondary elastomeric flex element 105. The elastomeric flex elements 91, 92, 104, 105 have a common center of rotation 93. The centering ring 103 is a spherical ring having a center point that coincides with this common center of rotation 93.

During construction of the flexible pipe joint 90, when the lower primary flex element 91 is molded, elastomer of the lower primary flex element 91 becomes bonded to the lower support ring 81 and bonded to the extension pipe 84. When the upper primary flex element 92 is molded, elastomer of the upper primary flex element 92 becomes bonded to the inner housing 95 and bonded to the inner pipe 94. The upper secondary flex element 104 and the lower secondary flex element 105 are molded at the same time, forming a single pressure-isolation unit 110 consisting of the upper liner 101, the lower liner 102, and the centering ring 103

The pressure-isolation unit 110 containing the secondary flex elements 104, 105 is then placed upon the assembly of the lower flex element 91, and the lower liner 102 is inserted into the extension pipe 84. Then the assembly of the upper flex element 92 is placed upon the assembly of the lower flex element 91, and the upper flange 96 of the extension pipe 84 is secured to the inner housing 95 by a series of bolts 105. An end ring metal gasket 106 seals the joint between the upper flange 96 of the extension pipe 84 and the inner housing 95. Then the cylindrical body 82 is placed upon the lower support ring 81 and secured to the lower support ring 81 by a series of bolts 107. Then the lower end of the lower inner liner 102 is welded to the lower end of the extension pipe 84, and the upper end of the upper inner liner 101 is welded to the upper end of the inner pipe 94. Then a flexible pressure line 109 is connected between a pressure port 108 in the inner housing 95 and a pressure port 114 in the attachment flange 83 so that the pressure port 114 in the attachment flange 83 permits measurement or adjustment of fluid pressure within an inner cavity 98. Then the attachment flange 83 is fitted upon the inner pipe 94 and the inner pipe 94 is welded to the attachment flange 83. Then the attachment flange 83 is secured to the cylindrical body 82 by a series of bolts 106.

During use in an offshore environment, the pressure port 114 permits external detection of any failure of the secondary flex elements 104, 105 to contain pressurized production fluid. If a failure is detected, then replacement of the pressure-isolation unit 110 including the secondary flex elements 104, 105 can be preformed immediately in the field, or the replacement can be scheduled to be performed at a future time if it would be more convenient to delay the replacement. Until replacement of the pressure-isolation unit, the upper primary flex element 92 will contain the production fluid within the inner cavity 98. The outer chamber 99 can be filled with an incompressible fluid such as propylene glycol or polyalkylene glycol so that pressure load of production fluid in the inner cavity 98 would be shared between the upper primary flex element 92 and the lower primary flex element 91.

For disassembly, the bolts 106 are removed so that the attachment flange 83 is no longer secured to the cylindrical body 82. Then the weld 113 between the inner pipe 94 and the attachment flange 83 is ground away so that the attachment flange can be removed from inner pipe. Also the weld 111 between the upper inner liner 101 and the inner pipe 94 is ground away, and the weld 112 between the lower inner line and the extension pipe 84 is ground away. Then the bolts 107 are removed so that the cylindrical body 82 can be removed from the lower support ring 81. Then the bolts 105 are removed so that the assembly of the upper flex element 107 can be removed from the assembly of the lower flex element 103. Then the pressure-isolation unit 110 (including the upper inner liner 101, the lower inner liner 102, the centering ring 103, the upper secondary flex element 104, and the lower secondary flex element 105) is removed from the extension pipe 84. This pressure-isolation unit 110 can be replaced with a new pressure-isolation unit, and the flexible pipe joint 90 can then be re-assembled in the field.

The flexible pipe joint 27 in FIG. 4 and the flexible pipe joint 90 in FIG. 8 should be used for an application such as a catenary riser in which the extension pipe 54 or 84 is subjected to axial tension rather than axial compression with respect to the outer housing of the flexible pipe joint. Otherwise, this compression would translate into tension on the flex elements and the axial compression on the extension pipe 54 or 84 would limit the service life of the flexible pipe joint. For applications in which the extension pipe may be subjected to substantial axial compression, the flexible pipe joint should be constructed as described below to limit transmission of the axial compression to the secondary flex elements.

Figure 9:
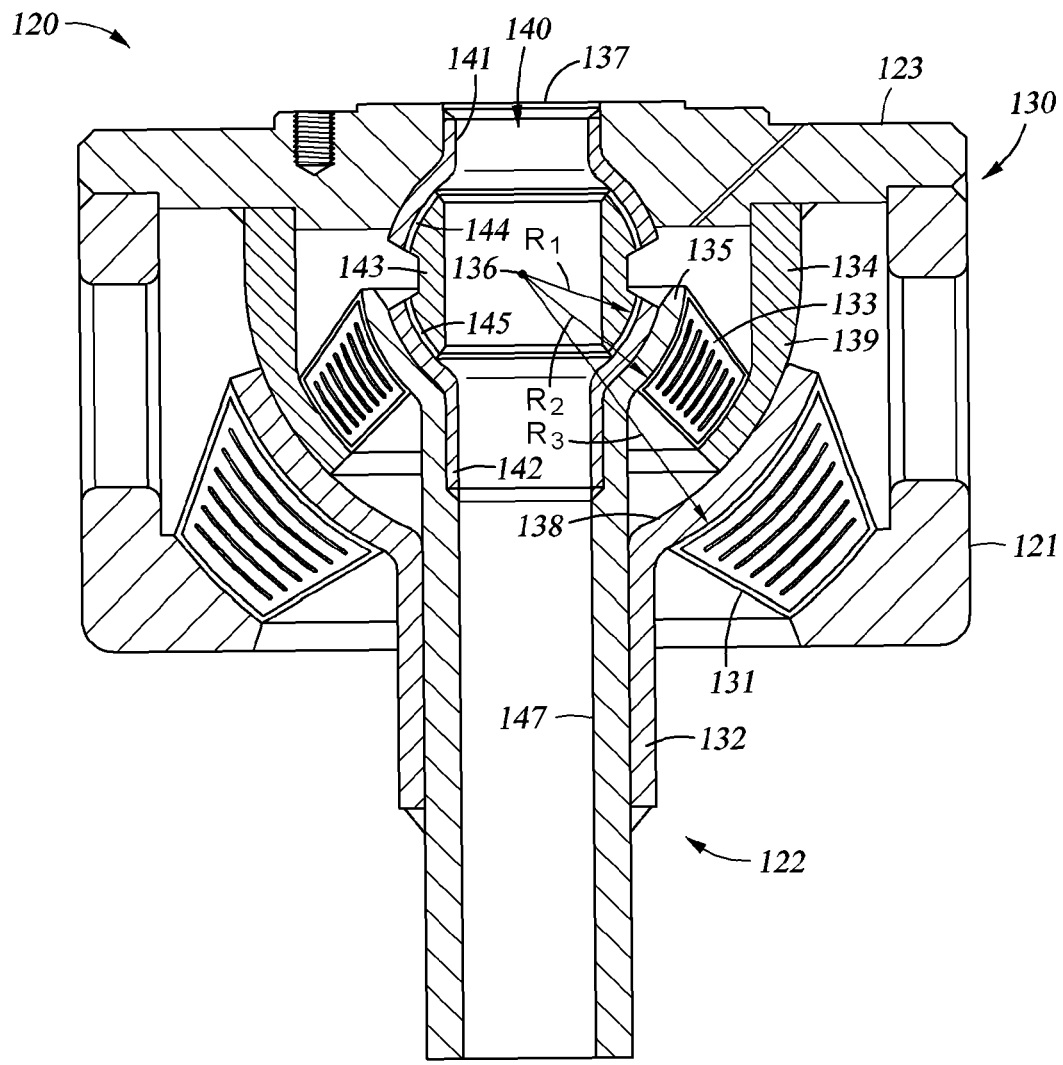
FIG. 9 shows an alternative construction for a flexible pipe joint in which two primary flex elements operating in parallel are located on the same side of a common center of rotation instead of on opposite sides.

FIG. 9 shows a flexible pipe joint 120 having an outer housing 130 and an extension pipe 122 extending from the outer housing. The outer housing 130 is comprised of a cylindrical body 121 and an attachment flange 123. The attachment flange 123 is welded to the cylindrical body 121. A lower primary annular elastomeric flex element 131 is bonded to the cylindrical body 121 and bonded to an extension jacket 132 of the extension pipe 122. An upper primary annular elastomeric flex element 133 is bonded to an inner housing 134 and bonded to an upper flange 135 of an inner liner 147 of the extension pipe 122. The inner housing 134 is welded to the attachment flange 123, and a lower end of the extension pipe jacket 132 is welded to the extension pipe liner 147.

The flexible pipe joint 120 includes a pressure isolation unit 140. The pressure isolation unit includes an upper liner 141, a lower liner 142, a spherical centering ring 143, an upper secondary annular elastomeric flex element 144 bonded between the upper liner 141 and the centering ring 143, and a lower annular elastomeric flex element 145 bonded between the lower liner 142 and the centering ring 143. The upper liner 141 is disposed in an aperture 137 in the attachment flange 123, and the lower liner 142 is disposed in the extension pipe liner 147.

The primary flex elements 131, 133 and the secondary flex elements 144, 145 have a common center of rotation 136. The secondary flex elements 144, 145 are stacked in a coaxial fashion on opposite sides of the common center of rotation 136 at a common inner radius $R_1$ from the common center of rotation. The primary flex elements 131, 133 are stacked and nested in a coaxial fashion on the same side of the common center of rotation. The upper primary flex element 133 is disposed at an outer radius $R_2$ from the common center of rotation 136, such that $R_2$ is greater than the inner radius $R_1$. The lower primary flex element 131 is disposed at an outer radius $R_3$ from the common center of rotation 136, such that $R_3$ is greater than the inner radius $R_1$, and $R_3$ is greater than the outer radius $R_2$. The secondary flex elements 144, 145 are mechanically joined in series with the centering ring 143 between the outer housing 130 and the extension pipe 122, the primary flex elements 131, 133 are mechanically joined in parallel to each other, and each of the primary flex elements 131, 133 is mechanically joined to the outer housing 130 and the extension pipe 122 in parallel with the series combination of the secondary flex elements 144, 145.

The extension jacket 132 has a hemispherical flange 138 abutting a complementary outer hemispherical surface 139 of the inner housing 134. Axial compression of the extension pipe 122 with respect to the outer housing 130 causes the hemispherical flange 138 of the extension pipe jacket 132 to contact the outer hemispherical surface 139 of the inner housing 134 so that the axial compressive force from the extension pipe 122 is transferred to the outer housing 130 through the extension jacket 132, the inner housing 134, and the attachment flange 123. Therefore, the axial compressive force is not applied to the pressure isolation unit 140 and its secondary flex elements 144, 145.

Figure 10:
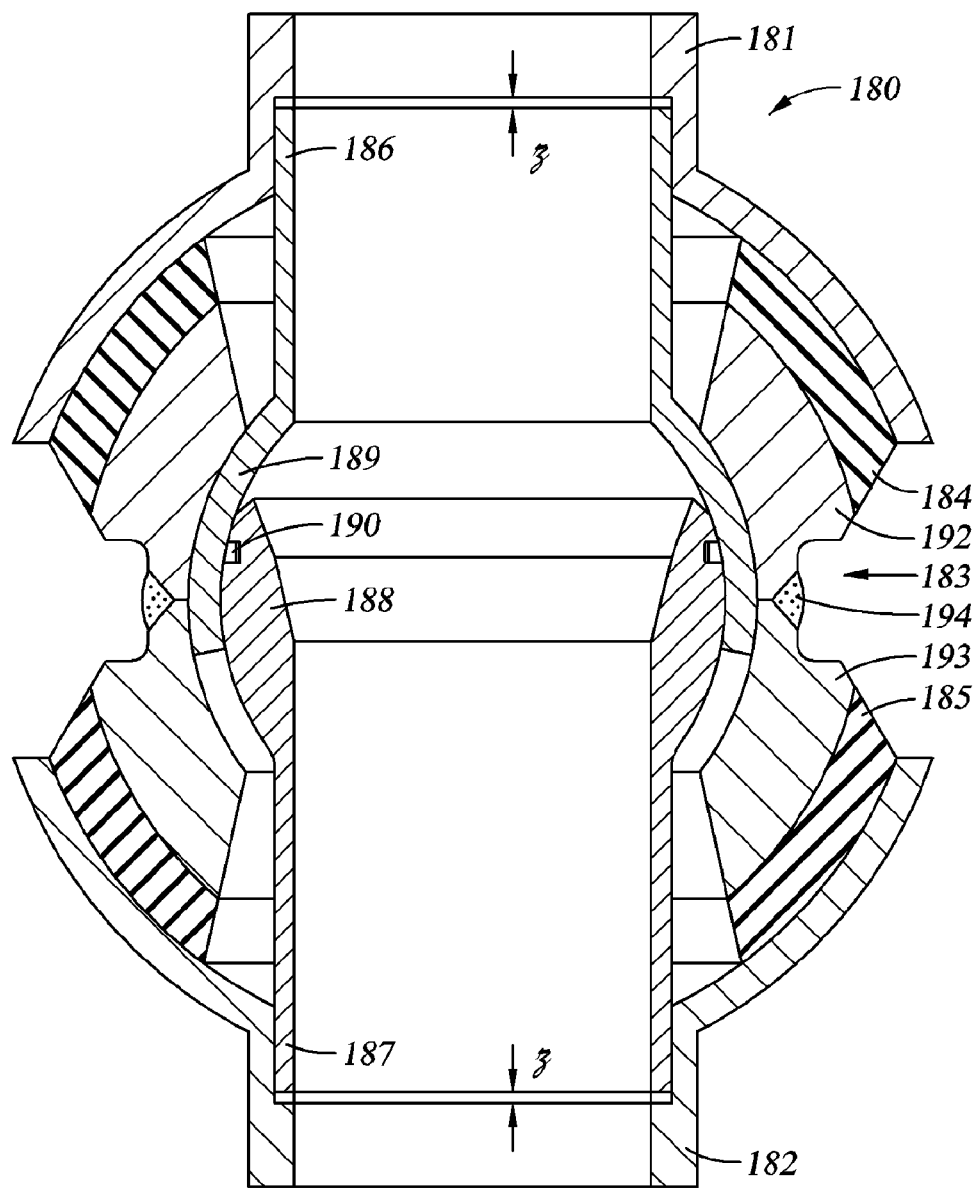
FIG. 10 shows a secondary flex element assembly including a heat shield.

FIG. 10 shows a pressure isolation unit 180 including an upper liner 181, a lower liner 182, a centering ring 183, an upper secondary annular elastomeric flex element 184, and a lower annular elastomeric flex element 185. Disposed in the centering ring 183 are an upper heat shield liner 186 and a lower heat shield liner 187. The heat shield liners 186, 187 are made of low heat conductivity material such as a nickel-chromium-iron alloy or a thermoplastic. The preferred nickel-chromium-iron alloy is Inconel brand alloy, which contains a minimum of 72% nickel and cobalt, 14-17% chromium, and 6-10% iron, such as 76% nickel, 17% chromium, and 7% iron. The preferred thermoplastic is poly ether ether ketone, or PEEK, as described in Moses et al., U.S. Pat. No. 7,341,283 issued Mar. 11, 2008, incorporated herein by reference.

The heat shield liners 186, 187 are assembled into a ball-and-socket joint. The lower heat shield liner 187 is formed with an upper spherical flange 188, and the upper heat shield liner 186 is formed with a lower hemispherical flange 189. The upper spherical flange 188 is inserted into the lower hemispherical flange 189, and then the lower end of the lower hemispherical flange 189 is crimped around the upper spherical flange 188. The upper spherical flange 188 is slotted to carry a split resilient metal sealing ring 190 that expands against the internal periphery of the lower hemispherical flange 189 to contain production fluid within the extension pipe. Thus, the sealing ring 190 functions in a fashion similar to a piston ring in an internal combustion engine. The sealing ring 190, however, need not provide a pressure-tight seal, and instead the sealing ring 190 prevents the production fluid from freely circulating though a clearance fit between the heat shield liners 186, 187.

For assembly of the heat shield liners 186, 187 into the pressure isolation unit 180, the centering ring 183 is formed of two hemispherical rings 192, 193 joined by an equatorial weld 194. When the upper secondary flex element 184 is molded, elastomer of the upper secondary flex element 184 is bonded to the upper liner 181 and bonded to the upper hemispherical ring 192. When the lower secondary flex element 185 is molded, elastomer of the lower secondary flex element 185 is bonded to the lower liner 182 and bonded to the lower hemispherical ring 193. Then the assembly of the upper secondary flex element 184 is fitted over the upper heat shield liner 186 of the heat shield assembly, and the assembly of the lower secondary flex element 185 is fitted over the lower heat shield liner 187 of the heat shield assembly, so that the two hemispherical rings 192, 193 are joined around the flanges 188, 189 of the heat shield assembly and welded together forming the equatorial weld 194.

The upper end of the upper heat shield liner 186 has a close clearance fit within a cylindrical recess in the upper pressure isolation liner 181, and the lower heat shield liner 187 has a close clearance fit within a cylindrical recess in the lower pressure isolation liner 182. Therefore, the heat shield liners 186, 187 present virtually no resistance to the lower pressure isolation liner 182 being pulled away from the upper pressure isolation liner 181 when tension is applied to the extension pipe with respect to the housing of a flexible pipe joint including the pressure isolation unit 180. In the absence of axial force from the extension pipe, there is a certain axial clearance (z) between the extreme ends of the heat shield liners 186, 187 and the cylindrical recesses in the pressure isolation liners 181, 182. The heat shield liners 186, 187 will resist compressive force between the lower pressure isolation liner 182 and the upper pressure isolation liner 181 when compression applied to the extension pipe with respect to the housing reaches a certain limit at which the axial clearance "z" is reduced to zero.

Figure 11:
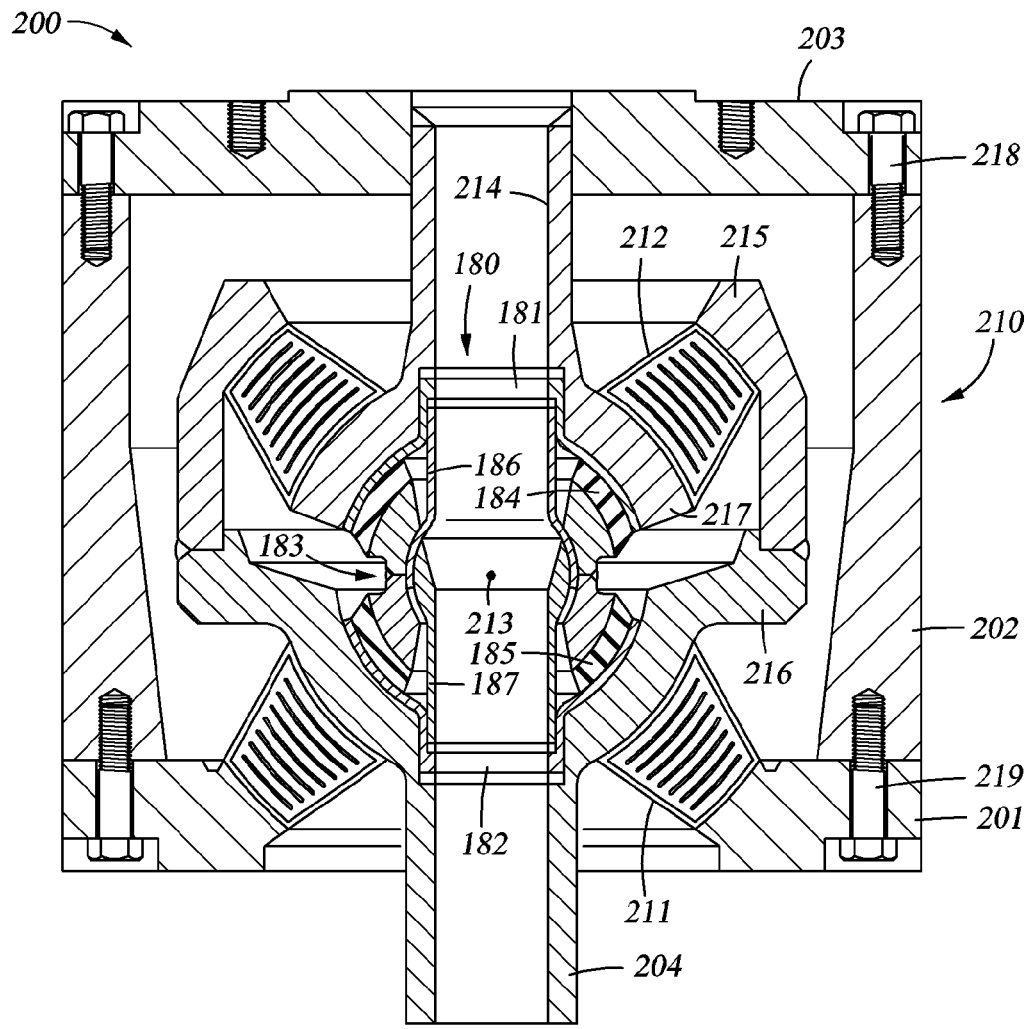
FIG. 11 shows a lateral cross-section of a flexible pipe joint including a secondary flex element assembly having a heat shield.

FIG. 11 shows the pressure isolation unit 180 of FIG. 10 assembled into a flexible pipe joint 200. The flexible pipe joint 200 includes an outer housing 210 comprised of a lower support ring 201, a cylindrical body 202, and an attachment flange 203. A series of bolts 219 secure the lower support ring 201 to the cylindrical body 202, and a series of bolts 218 secure the attachment flange 203 to the cylindrical body 202. An extension pipe 204 extends from the outer housing 210. A lower primary annular elastomeric flex element 211 is disposed in the outer housing 210 for mounting the extension pipe 204 to the outer housing 210, and an upper primary elastomeric flex element 212 is also disposed in the housing for mounting the extension pipe 204 to the outer housing 210. The primary flex elements share a common center of rotation 213 and are stacked in a coaxial fashion.

During molding of the lower primary flex element 211, elastomer of the lower primary flex element 211 is bonded to the lower support ring 201 and bonded to an upper flange 216 of the extension pipe 204. During molding of the upper primary flex element 212, elastomer of the upper primary flex element 212 is bonded to the inner housing 215 and bonded to a lower flange 217 of an inner pipe 214. After assembly of the pressure isolation unit 180, the lower pressure liner 182 of the pressure isolation unit 180 is inserted into a cylindrical recess in the extension pipe 204, and the upper pressure liner 181 of the pressure isolation unit 180 is inserted into a cylindrical recess in the inner pipe 214 when the assembly of the upper primary flex element 212 is fitted upon the assembly of the lower primary flex element 211. In this fashion, the pressure isolation unit 180 becomes seated within a spherical cavity bounded by an inner hemispherical surface of the upper flange 216 of the extension pipe 204 and an inner hemispherical surface of the lower flange 217 of the inner pipe 204. Then the lower end of the inner housing 215 is welded to the upper end of the upper flange 216 of the extension pipe 204. Then the upper end of the pressure liner 181 of the pressure isolation unit 180 is welded to the inner pipe 214, and the lower end of the lower pressure liner 182 of the pressure isolation unit 180 is welded to the extension pipe 204. Then the cylindrical body 202 is bolted to the lower support ring 201, and the attachment flange 203 is fitted over the upper end of the inner pipe 214 and bolted to the cylindrical body 202. Then the inner pipe 214 is welded to the attachment flange 203.

Figure 12:
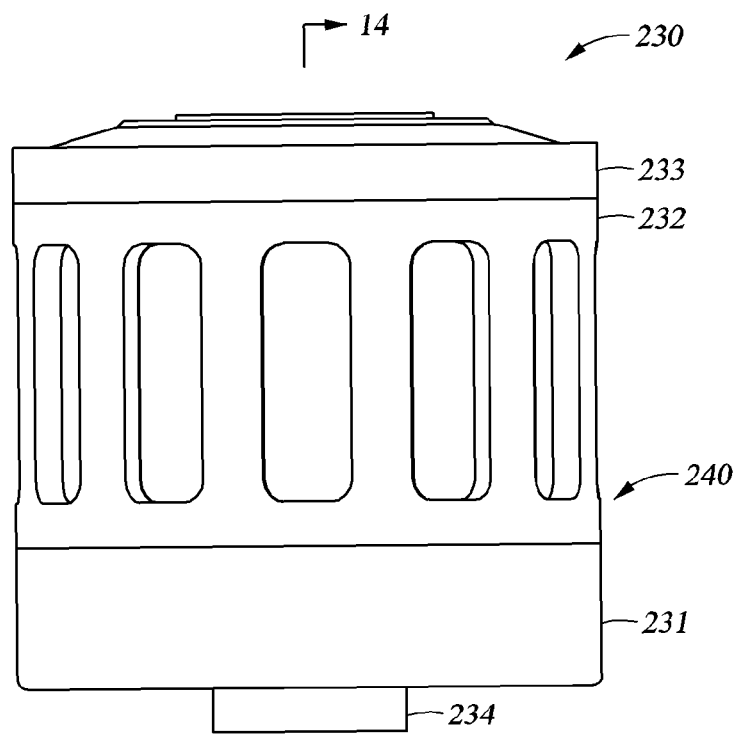
FIG. 12 shows a front view of another flexible pipe joint including multiple flex elements.
Figure 13:
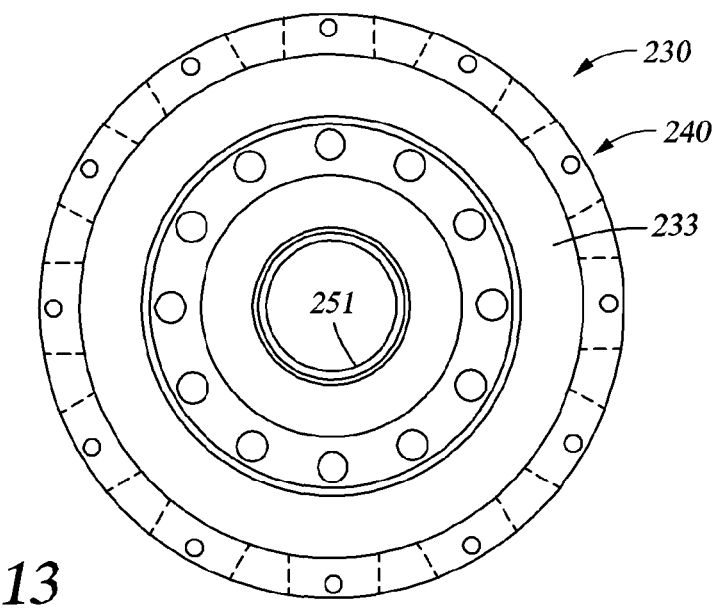
FIG. 13 shows a top view of the flexible pipe joint of FIG. 12.
Figure 14:
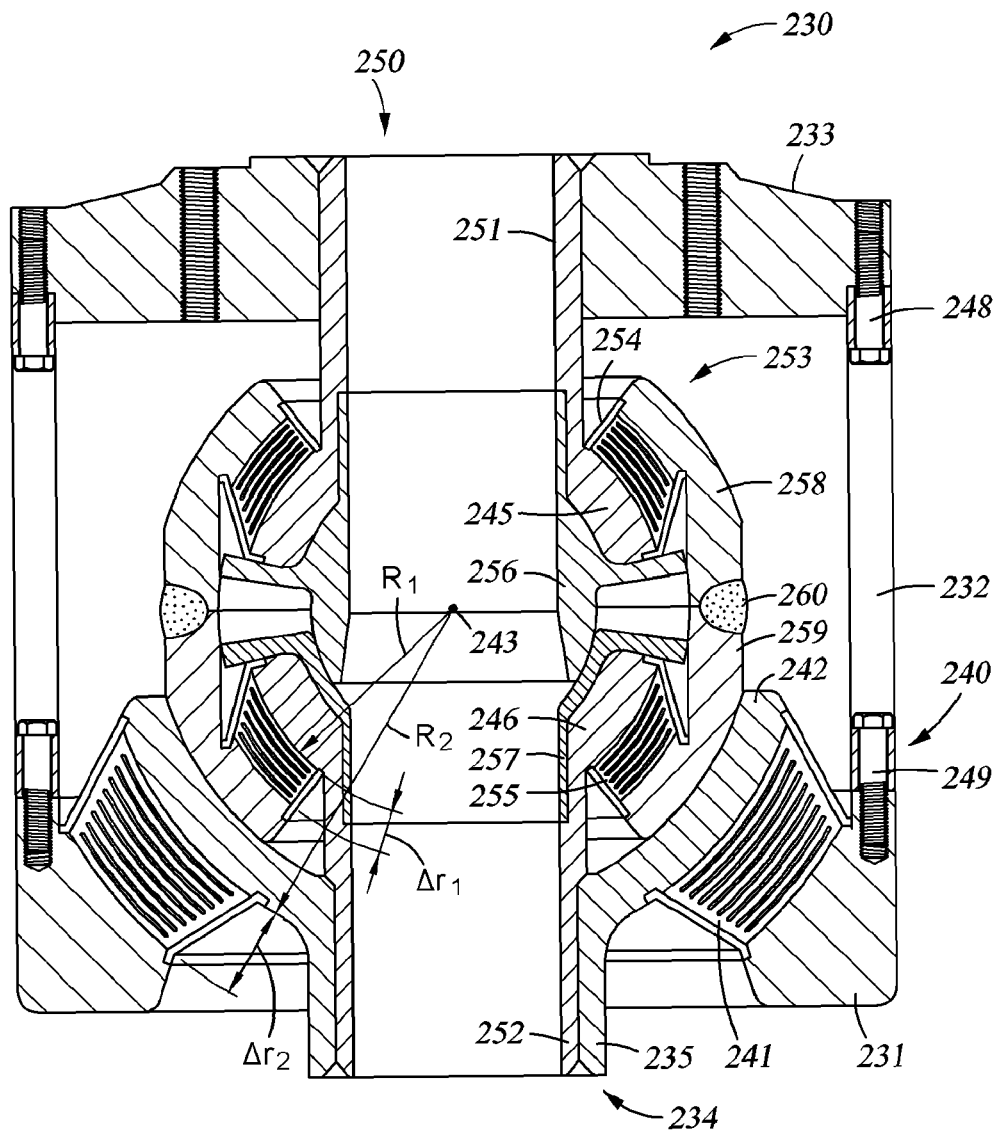
FIG. 14 is a lateral cross-section along line 14-14 in FIG. 12.

FIGS. 12, 13, and 14 show various views of a flexible pipe joint 230 in which the secondary flex elements 254, 255 may, but need not have the same elastomer composition as the primary flex element 241, and in which the secondary flex elements are directly subjected to pressure and transport fluid temperature, and function as a pressure isolation unit.

As shown in FIG. 12, the flexible pipe joint 230 includes an outer housing 240 comprised of a lower support ring 231, a cylindrical body 232, and an attachment flange 233. An extension pipe 234 extends from the outer housing 240.

As shown in FIG. 13, an inner pipe 251 is welded to the attachment flange 233 and provides an aperture in the attachment flange.

As shown in FIG. 14, the secondary flex elements 254, 255 are mechanically connected in series between the housing 240 and the extension pipe 234 and the primary flex element 241 is mechanically connected in parallel to the series combination of the secondary flex elements 254, 255. The parallel arrangement forces the angular and axial displacements of the primary flex element 241 to be the same as those of the extension pipe 234, while the series arrangement of the secondary flex elements 254, 255 allows the secondary flex elements to split a given displacement, axial or angular, in proportion to their corresponding stiffness. Because of this, for example, the angular and axial displacements of secondary flex elements 254, 255, of essentially identical shape and composition, would be approximately one half those experienced by the extension pipe 234, or primary flex element 241. This design feature allows sizing the primary flex element so as to carry a large portion of the total axial load resulting from the tension on the extension pipe 234 and the fluid pressure acting on the assembly (252, 257, 246, and 255) of the secondary flex element 255, connected to the extension pipe 234, thus limiting the amount of compression on the elastomeric pads of the secondary flex elements 254, 255, and thereby increasing their useful life, and that of the flexible pipe joint 230.

As further shown in FIG. 14, a series of bolts 248 secure the attachment flange 233 to the cylindrical body 232, and a series of bolts 249 secure the lower support ring 231 to the cylindrical body 232. The inner pipe 251 provides a channel from the aperture in the attachment flange to the extension pipe 234. The extension pipe 234 includes an inner liner 252 and an outer jacket 235. A primary annular elastomeric flex element 241 mounts the outer jacket 235 of the extension pipe 234 to the lower support ring 231.

A pressure isolation unit 250 includes the inner pipe 251, the extension pipe liner 252, a spherical centering ring 253, an upper secondary annular elastomeric flex element 254 disposed between a lower flange 245 of the inner pipe 251 and an upper half 258 of the centering ring 253, and a lower secondary annular elastomeric flex element 255 disposed between an upper flange 246 of the extension pipe liner 252 and a lower half 259 of the centering ring 253. The lower flange 245 of the inner pipe 251 is disposed within the upper half 258 of the centering ring 253. The upper flange 246 of the extension pipe liner 252 is disposed within the lower half 259 of the centering ring 253. A lower portion of the lower half 259 of the centering ring 253 is disposed between the upper flange 242 of the outer jacket 235 of the extension pipe 234 and the upper flange 246 of the extension pipe liner 252.

The primary flex element 241 and the secondary flex elements 254 and 255 have a common center of rotation 243. The secondary flex elements 254 and 255 are stacked in a coaxial fashion on opposite sides of the common center of rotation 243. The secondary flex elements 254 and 255 are disposed from the common center of rotation 243 by a common inner radius $R_1$. The primary flex element 241 is disposed from the common center of rotation 243 by an outer radius $R_2$ that is greater than the inner radius $R_1$. The secondary flex elements 254 and 255 are mechanically joined in series between the housing 240 and the extension pipe 234, and the primary flex element 241 is mechanically joined to the housing 240 and the extension pipe 234 in parallel with the series combination of the upper and lower secondary flex elements 254 and 255.

Figure 16:
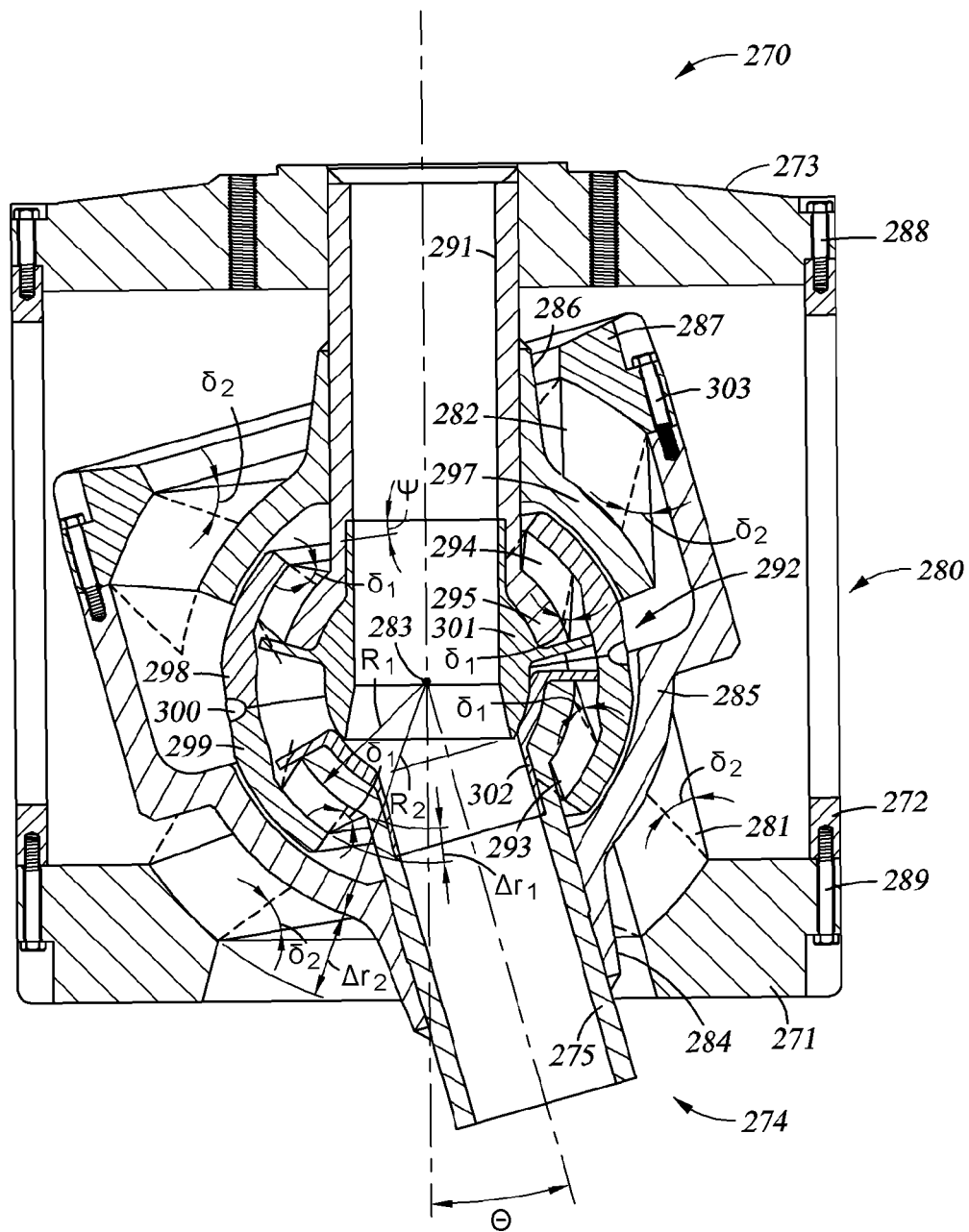
FIG. 16 shows the flex elements in FIG. 15 reacting to an angular deflection of the extension pipe of about 20 degrees.

An angular displacement ($\theta$) of the extension pipe 234 with respect to the housing 240 about the common center of rotation 243 causes an angular deformation or shear ($\delta_2$) of the primary flex element 241 that is proportional to the ratio of the outer radius ($R_2$) divided by the radial thickness ($\Delta r_2$) of the primary flex element 241. (The angular deformations of the flex elements in a more complex flexible pipe joint are shown in FIG. 16, which is further described below.) Thus, $$\delta_2 = \theta R_2 / \Delta r_2$$

In the flexible pipe joint 230, the composition and shape of the upper secondary flex element 254 is virtually the same as the composition and shape of the lower secondary flex element 255. Thus, the angular displacement ($\theta$) of the extension pipe 234 with respect to the housing 240 about the common center of rotation 243 causes rotation of the centering ring 253 about the common center of rotation by an angle ($\phi$) that is very nearly one half of the angular displacement ($\theta$) of the extension pipe 234 with respect to the housing 240. Consequently, the angular displacement ($\theta$) of the extension pipe 234 with respect to the housing 240 about the common center of rotation 243 causes an angular deformation or shear ($\delta_1$) of each of the secondary flex elements 254, 255 that is proportional to the ratio of the outer radius ($R_1$) divided by the radial thickness ($\Delta r_1$) of each of the secondary flex elements 254, 255, according to:

$$\delta_1 = \theta R_1 / 2\Delta r_1$$

As shown in FIG. 14, the shape of the primary flex element 241 can be similar to the shape of the secondary flex elements 254 and 255, so that $R_1/\Delta r_1 = R_2/\Delta r_2$. Therefore, because the primary flex element is mechanically joined to the housing 240 and the extension pipe 234 in parallel with the series combination of the upper and lower flex elements 254, 255, the angular displacement ($\theta$) of the extension pipe 235 with respect to the housing 240 about the common center of rotation 243 causes an angular deformation ($\delta_1$) of each of the secondary flex elements that is about one half of the angular deformation ($\delta_2$) of the primary flex element 241. Thus, each of the secondary flex elements can have the same composition and construction and a similar shape as the primary flex element 241, yet each of the secondary flex elements will have an angular deformation ($\delta_1$) that is substantially less than the angular deformation ($\delta_2$) of the primary flex element 241. A similar argument, applied to axial displacements, shows that secondary flex elements 254, 255 displace substantially less than the extension pipe 234 or the primary flex element 241. Consequently, the secondary flex elements 254, 255 may be subjected to a higher load of pressure or temperature than the primary flex element 241 without significantly reducing the service life of the flexible pipe joint 230.

For example, in FIGS. 12 and 14, the cylindrical body 232 is perforated to allow water to pass through the cylindrical body 232 for cooling of the flex elements 241, 254, 255, and the secondary flex elements 254, 255 are closer to the central channel of the extension pipe 234 and the inner pipe 251, so that the secondary flex elements 254, 255 are subjected to a higher temperature from hot production fluid than the primary flex element 241. In addition, the secondary flex elements 254, 255 seal pressure within the extension pipe 234, and the primary flex element 255 is not subjected to this pressure. For a particular application, the thickness ($\Delta r_1$) of the secondary flex elements 254, 255 can be selected so that the angular deformation ($\delta_1$) of the secondary flex elements is reduced relative to the angular deformation ($\delta_2$) of the primary flex element 241 by an amount just sufficient to handle the increased pressure or temperature load upon the secondary flex elements relative to the primary flex element. Moreover, axial tension upon the extension pipe 234 places the secondary flex elements 245, 255 in compression, so that the secondary flex elements also contribute to the capability of the flexible pipe joint 230 to handle a high level of axial tension upon the extension pipe 234.

In order to reduce the temperature load upon the secondary flex elements 254, 255, the pressure isolation unit 250 includes an upper thermal barrier insert 256 disposed in the lower flared end 245 of the inner pipe 251, and a lower thermal barrier insert 257 disposed in the upper flared end 246 of the extension pipe insert 252. The thermal barrier inserts 256, 257 are made of a low thermal conductivity material such as a nickel-iron-chromium alloy or poly ether ether ketone. The thermal barrier inserts 256, 257 also form a ball-and-socket joint within the centering ring 253.

The centering ring 253 is split into the hemispherical upper half 258 and the hemispherical lower half 259 so that the two halves of the centering ring can be welded together around the thermal barrier inserts 256, 257 after molding of the secondary flex elements 254, 255. When the upper secondary flex element 254 is molded, elastomer of the upper secondary flex element 254 becomes bonded to the upper half 258 of the centering ring and bonded to the lower flange 245 of the inner pipe 251. When the lower secondary flex element 255 is molded, elastomer of the lower secondary flex element 255 becomes bonded to the lower half 259 of the centering ring 253 and bonded to the upper flange 246 of the extension pipe insert 252. Then the upper thermal barrier insert 256 is inserted into the inner pipe 251, and the lower thermal barrier insert 257 is inserted into the extension pipe insert 252. Then the upper thermal barrier insert 256 is inserted into the lower thermal barrier insert 257 so that the upper half 258 of the centering ring 253 is mated with the lower half 259 of the centering ring and welded to the lower half of the centering ring, forming the weld 260.

When the primary flex element 241 is molded, elastomer of the primary flex element becomes bonded to the lower support ring 231 and bonded to the flange 242 of the outer jacket 235 of the extension pipe 234. Then the extension pipe insert 252 is inserted into the extension pipe jacket 235 so that the pressure isolation system 250 is seated upon the extension pipe jacket 235. Then the cylindrical body 232 is placed upon the lower support ring 231, and the attachment flange 233 is fitted over the inner pipe 251 and upon the cylindrical body 232. Then the bolts 249 are tightened to secure the cylindrical body 232 to the lower support ring 231, and the bolts 248 are tightened to secure the attachment flange 233 to the cylindrical body 232. Finally, the extension pipe insert 252 is welded to the extension pipe jacket 235, and the inner pipe 251 is welded to the attachment flange 233.

Figure 15:
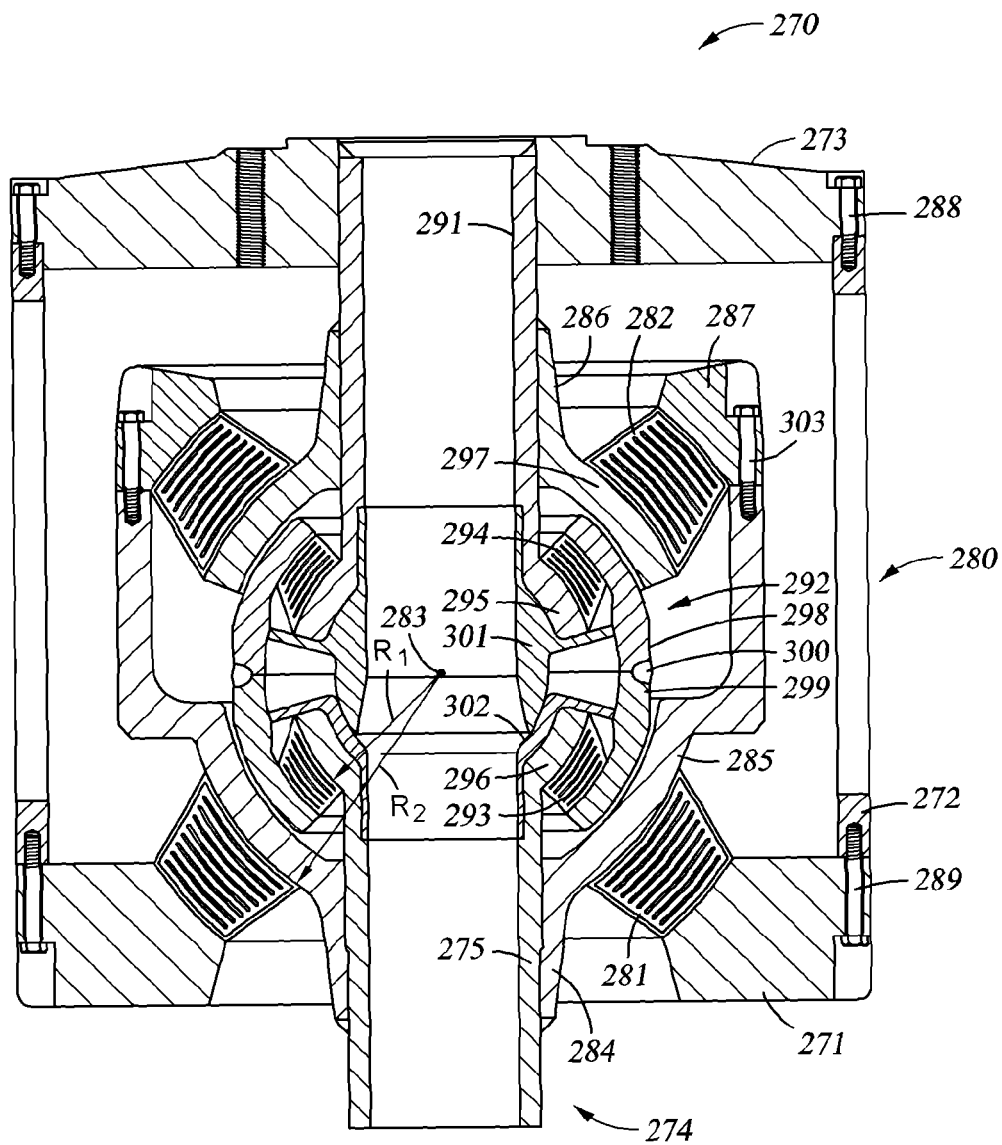
FIG. 15 shows a lateral cross-section of an alternative construction for a flexible pipe joint including multiple primary and secondary flex elements.

FIG. 15 shows a flexible pipe joint 270 that is similar to the flexible pipe joint 230 of FIG. 14, but which includes two primary flex elements 281, 282 mechanically coupled in parallel for handling an increased axial load for a housing of a given footprint. The flexible pipe joint 270 in FIG. 15 has a housing 280 and an extension pipe 274 extending from the housing 280. The housing 280 includes a lower support ring 271, a cylindrical body 272, and an attachment flange 273. The extension pipe 274 is comprised of an extension pipe liner 275 and an extension pipe jacket 284 welded to the extension pipe liner 275.

A lower primary annular elastomeric flex element 281 is disposed in the housing 280 between the lower support ring 271 and a flange 285 of the extension pipe jacket 284. An upper primary annular elastomeric flex element 282 is disposed in the housing 280 between an upper load ring 287 and a flange 297 of an inner pipe jacket 286 welded to an inner pipe liner 291. The inner pipe liner 291 is welded to the attachment flange 273. The upper load ring 287 is secured by a series of bolts 303 to the flange 285 of the extension pipe jacket 284. A lower secondary annular elastomeric flex element 293 is disposed in the housing 280 between a lower half 299 of a centering ring 292 and an upper flange 296 of the extension pipe liner 275. An upper secondary annular elastomeric flex element 294 is disposed in the housing 280 between an upper half 298 of the centering ring 292 and a lower flange 295 of the inner pipe liner 291. The upper half 298 of the centering ring 292 is secured by an equatorial weld 300 to the lower half 299 of the centering ring 292.

The lower secondary flex element 293, the upper secondary flex element 294, the lower primary flex element 281, and the upper primary flex element 282, have a common center of rotation 283. The lower secondary flex element 293 and the upper secondary flex element 294 are stacked in a coaxial fashion on opposite sides of the common center of rotation 283, and the lower secondary flex element 293 and the upper secondary flex element 294 are disposed from the common center of rotation 283 by a common inner radius ($R_1$). The lower primary flex element 281 and the upper primary flex element 282 are also stacked in a coaxial fashion on opposite sides of the common center of rotation 283, and the lower primary flex element 281 and the upper primary flex element 282 are disposed from the common center of rotation 283 by a common outer radius ($R_2$). The outer radius ($R_2$) is greater than the inner radius ($R_1$).

The lower and upper secondary flex elements 293, 294 are mechanically joined in series between the housing 280 and the extension pipe 274. Each of the lower primary flex element 281 and the upper primary flex element 282 is mechanically joined to the housing 280 and to the extension pipe 274 in parallel with the series combination of lower and upper secondary flex elements 293, 294. The upper and lower secondary flex elements 293, 294 have virtually the same composition and shape. Consequently, an angular displacement ($\theta$) of the extension pipe 274 with respect to the housing 280 about the common center of rotation 283 causes an angular displacement ($\phi$) of the centering ring 292 with respect to the housing 280 about the common center of rotation 283 that is about half the angular displacement ($\theta$) of the extension pipe 274 with respect to the housing 280 about the common center of rotation 283.

The upper and lower primary flex elements 281, 282 need not have the same size or composition, but the secondary flex elements 293, 294 will usually be of the same composition and the shape. Axial tension upon the extension pipe 274 with respect to the housing 280 places each of the primary and secondary flex elements 281, 282, 293, 294 in compression.

Because the primary flex elements 281, 282 are mechanically joined in parallel to each other, their axial and angular displacements will be the same, and because the primary flex elements 281, 282 are mechanically joined in parallel to each other and in parallel to the secondary flex elements through the extension pipe liner 275 of the extension pipe 274, the axial and angular displacements of each secondary flex element 293, 294 will be approximately half those of the extension pipe liner 275, or extension pipe 274, or primary flex elements 281, 282. This design feature allows sizing the primary flex elements so as to carry a large portion of the total axial load resulting from the tension on the extension pipe 274 and the fluid pressure acting on the assembly of the secondary flex element 293, connected to the extension pipe 274, thus limiting the amount of compression on the elastomeric pads of the secondary flex elements 293, 294, and thereby increasing their useful life, and that of the flexible pipe joint 270.

An upper heat shield liner 301 is disposed in the inner pipe liner 291, and a lower heat shield liner 302 is disposed in the extension pipe liner 275.

FIG. 16 shows the flexible pipe joint 270 after an angular deflection ($\theta$) of the extension pipe 274 of about 20 degrees with respect to the housing 280. The resulting angular deflection ($\phi$) of the centering ring 292 is about 10 degrees. Versions of the primary and secondary flex elements 281, 282, 293, 294 without deformation are shown in phantom lines for depiction of the resulting angular deformation ($\delta_1$) of the secondary flex elements 293, 294 and the resulting angular deformation ($\delta_2$) of the primary flex elements 281, 282. Therefore, it is shown that the resulting angular deformation ($\delta_1$) of the secondary flex elements 293, 294 is substantially less than the angular deformation ($\delta_2$) of the primary flex elements 281, 282.

In view of the above, there has been described a flexible joint having two annular elastomeric flex elements stacked in a co-axial fashion at an inner radius from a common center of rotation, and at least one annular elastomeric flex element disposed at an outer radius from the common center of rotation. The flex elements at the inner radius are coupled mechanically in series between the extension pipe and the housing of the flexible pipe joint, and the flex element at the outer radius is coupled in parallel with the series combination of the flex elements at the inner radius. Consequently, for a preferred case of the two flex elements at the inner radius having approximately the same size, shape, and construction, each flex element at the inner radius has an angular displacement that is about one half that of the flex element at the outer radius. Therefore, the flex elements at the inner radius may carry additional loading of pressure and heat.

What is claimed is:

1. A flexible pipe joint comprising:
a housing;
an extension pipe extending from the housing;
a first annular elastomeric flex element disposed in the housing;
a second annular elastomeric flex element disposed in the housing; and
a third annular elastomeric flex element disposed in the housing;
wherein the first, second, and third flex elements have a common center of rotation, the first and second flex elements are stacked in a coaxial fashion on opposite sides of the common center of rotation, the first and second flex elements are disposed from the common center of rotation by a common inner radius, and the third flex element is disposed from the common center of rotation by an outer radius greater than the inner radius; and
wherein the first and second flex elements are mechanically joined in series between the housing and the extension pipe, and the third flex element is mechanically joined to the housing and the extension pipe in parallel with the series combination of the first and second flex elements.

2. The flexible pipe joint as claimed in claim 1, wherein an angular displacement of the extension pipe with respect to the housing causes an angular deformation of each of the first, second, and third flex elements, and the angular deformation of each of the first and second flex elements is less than the angular deformation of the third flex element.

3. The flexible pipe joint as claimed in claim 1, wherein an angular displacement of the extension pipe with respect to the housing causes an angular displacement of each of the first and second flex elements that is about one half of the angular displacement of the extension pipe with respect to the housing, and the angular displacement of the extension pipe with respect to the housing causes an angular displacement of the third flex element that is substantially equal to the angular displacement of the extension pipe with respect to the housing.

4. The flexible pipe joint as claimed in claim 1, wherein the first and second flex elements seal pressure within the extension pipe so that the third flex element is not subjected to the pressure within the extension pipe.

5. The flexible pipe joint as claimed in claim 4, wherein the third flex element seals a cavity within the housing, and the housing includes a port for monitoring pressure within the cavity for sensing whether the first and second flex elements fail to seal the pressure within the extension pipe.

6. The flexible pipe joint as claimed in claim 1, which further includes a fourth annular elastomeric flex element disposed at the outer radius from the common center of rotation, wherein the fourth flex element is stacked in the housing in a coaxial fashion with respect to the third flex element, and the fourth flex element is joined mechanically in parallel with the third flex element.

7. The flexible pipe joint as claimed in claim 1, wherein the third flex element is disposed within the housing between a flange of the extension pipe and the housing, and the flexible pipe joint further includes a centering ring connecting the first flex element to the second flex element in series between the housing and the extension pipe so that the centering ring is subjected to an angular displacement with respect to the housing of about half of the angular displacement of the extension pipe with respect to the housing.

8. The flexible pipe joint as claimed in claim 7, wherein the centering ring is disposed at a radius from the common center of rotation that is between the inner radius and the outer radius, and axial tension upon the extension pipe with respect to the housing places each of the first, second, and third flex elements in compression.

9. The flexible pipe joint as claimed in claim 7, which further includes a ball and socket joint within the centering ring, and wherein the centering ring includes two sections welded together for assembly of the ball and socket joint within the centering ring.

10. The flexible pipe joint as claimed in claim 1, which further includes:
an inner pipe attached to the housing;
a first inner liner;
a second inner liner; and
a centering ring;
wherein the first flex element is disposed between the centering ring and the first inner liner;
the second flex element is disposed between the centering ring and the second inner liner;
the first inner liner is disposed in and welded to the inner pipe; and
the second inner liner is disposed in and welded to the extension pipe.

11. A flexible pipe joint comprising:
a housing having a first end and a second end;
an attachment flange mounted at the first end of the housing;
an extension pipe extending from the second end of the housing, the extension pipe having an inner flange and an outer jacket;
an inner pipe disposed within the housing and mounted to the attachment flange and providing a channel from an aperture in the attachment flange to the extension pipe;
a spherical centering ring disposed within the housing, the inner pipe having a flange within the centering ring, the inner flange of the extension pipe being disposed within the centering ring, and a portion of the centering ring being disposed between the outer jacket of the extension pipe and the inner flange of the extension pipe;
a first annular elastomeric flex element disposed within the housing between the centering ring and the inner flange of the extension pipe;
a second annular elastomeric flex element disposed within the housing between the centering ring and the flange of the inner pipe; and
a third annular elastomeric flex element disposed within the housing between the outer jacket of the extension pipe and the housing for mounting the extension pipe to the housing for angular displacement of the extension pipe with respect to the housing, the extension pipe passing through the third flex element so that the third flex element encircles the extension pipe;
wherein the centering ring couples the first and second flex elements mechanically in series between the extension pipe and the housing so that the angular displacement of the extension pipe with respect to the housing causes an angular displacement of the centering ring with respect to the housing that is about half of the angular displacement of the extension pipe with respect to the housing, and so that axial tension upon the extension pipe with respect to the housing places each of the first, second, and third flex elements in compression.

12. The flexible pipe joint as claimed in claim 11, wherein the first flex element and the second flex element seal pressure within the extension pipe so that the third flex element is not subjected to the pressure within the extension pipe.

13. The flexible pipe joint as claimed in claim 11, wherein the inner pipe has an outer jacket, and the second flex element is disposed between the outer jacket of the inner pipe and the flange of the inner pipe, and which further includes a fourth annular elastomeric flex element disposed within the housing and coupling the outer jacket of the inner pipe to the outer jacket of the extension pipe.

14. A flexible pipe joint comprising:
a housing having a first end and a second end;
an attachment flange mounted at the first end of the housing;
a support ring mounted at the second end of the housing;
an extension pipe extending from the second end of the housing, the extension pipe having an inner flange and an outer jacket;
an inner pipe disposed within the housing and welded to the attachment flange and providing a channel from an aperture in the attachment flange to the extension pipe, the inner pipe having an inner flange and an outer jacket;
a spherical centering ring disposed within the housing, the inner flange of the inner pipe being disposed within the centering ring, and the inner flange of the extension pipe being disposed within the centering ring;
a first annular elastomeric flex element disposed within the housing between the centering ring and the inner flange of the extension pipe, elastomer of the first flex element being bonded to the centering ring and bonded to the inner flange of the extension pipe;
a second annular elastomeric flex element disposed within the housing between the centering ring and the inner flange of the inner pipe, elastomer of the second flex element being bonded to the centering ring and bonded to the inner flange of the inner pipe;
a third annular elastomeric flex element disposed within the housing between the support ring and the outer jacket of the extension pipe, elastomer of the third flex element being bonded to the support ring and bonded to the outer jacket of the extension pipe, the third flex element mounting the extension pipe to the housing for angular displacement of the extension pipe with respect to the housing, the extension pipe passing through the third flex element so that the third flex element encircles the extension pipe;
a load ring secured to the outer jacket of the extension pipe; and
a fourth annular elastomeric flex element disposed within the housing between the load ring and the outer jacket of the inner pipe, elastomer of the fourth flex element being bonded to the load ring and bonded to the outer jacket of the inner pipe, the inner pipe passing through the fourth flex element so that the fourth flex element encircles the inner pipe.

15. The flexible pipe joint as claimed in claim 14, wherein the first, second, third, and fourth flex elements share a common center of rotation, the first and second flex elements are disposed at a common inner radius from the common center of rotation, the third and fourth flex elements are disposed at a common outer radius from the common center of rotation, the outer radius is greater than the inner radius, the first and second flex elements are stacked in a coaxial fashion so that the first and second flex elements are disposed on opposite sides of the common center of rotation, and the third and fourth flex elements are stacked in a coaxial fashion so that the third and fourth flex elements are disposed on opposite sides of the common center of rotation.

16. A flexible pipe joint comprising:
a housing;
an extension pipe extending from the housing;
a first annular elastomeric flex element disposed in the housing;
a second annular elastomeric flex element disposed in the housing; and
a third annular elastomeric flex element disposed in the housing;
wherein the first, second, and third flex elements have a common center of rotation, the first and second flex elements are stacked in a coaxial fashion on opposite sides of the common center of rotation, the first and second flex elements are disposed from the common center of rotation by a common inner radius, and the third flex element is disposed from the common center of rotation by an outer radius greater than the inner radius; and
wherein the first flex element is mechanically joined to the housing, the second flex element is mechanically joined to the first flex element and mechanically joined to the extension pipe, and the third flex element is mechanically joined to the housing and mechanically joined to the extension pipe;
wherein an angular displacement of the extension pipe with respect to the housing causes an angular displacement of each of the first and second flex elements that is about one half of the angular displacement of the extension pipe with respect to the housing, and the angular displacement of the extension pipe with respect to the housing causes an angular displacement of the third flex element that is equal to the angular displacement of the extension pipe with respect to the housing.

17. The flexible pipe joint as claimed in claim 16, wherein the first and second flex elements seal pressure within the extension pipe so that the third flex element is not subjected to the pressure within the extension pipe.

18. The flexible pipe joint as claimed in claim 16, which further includes a fourth annular elastomeric flex element disposed at the outer radius from the common center of rotation, wherein the fourth flex element is stacked in the housing in a coaxial fashion with respect to the third flex element, and the fourth flex element is joined mechanically in parallel with the third flex element.

19. The flexible pipe joint as claimed in claim 16, wherein the third flex element is disposed within the housing between a flange of the extension pipe and the housing, and the flexible pipe joint further includes a centering ring connecting the first flex element to the second flex element so that the centering ring is subjected to an angular displacement with respect to the housing of about half of the angular displacement of the extension pipe with respect to the housing.

20. The flexible pipe joint as claimed in claim 19, wherein the centering ring is disposed at a radius from the common center of rotation that is between the inner radius and the outer radius, and axial tension upon the extension pipe with respect to the housing places each of the first, second, and third flex elements in compression.

21. The flexible pipe joint as claimed in claim 19, which further includes a ball and socket joint within the centering ring, and wherein the centering ring includes two sections welded together for assembly of the ball and socket joint within the centering ring.

22. A flexible pipe joint comprising:
a housing having a first end and a second end;
an attachment flange mounted at the first end of the housing;
an extension pipe extending from the second end of the housing, the extension pipe having an inner flange and an outer jacket;
an inner pipe disposed within the housing and mounted to the attachment flange and providing a channel from an aperture in the attachment flange to the extension pipe;
a spherical centering ring disposed within the housing, the inner pipe having a flange within the centering ring, the inner flange of the extension pipe being disposed within the centering ring, and a portion of the centering ring being disposed between the outer jacket of the extension pipe and the inner flange of the extension pipe;
a first annular elastomeric flex element disposed within the housing between the centering ring and the inner flange of the extension pipe;
a second annular elastomeric flex element disposed within the housing between the centering ring and the flange of the inner pipe; and
a third annular elastomeric flex element disposed within the housing between the outer jacket of the extension pipe and the housing for mounting the extension pipe to the housing for angular displacement of the extension pipe with respect to the housing, the extension pipe passing through the third flex element so that the third flex element encircles the extension pipe;
wherein the first flex element is coupled to the inner flange of the extension pipe, the centering ring couples the first flex element to the second flex element, and the second flex element is coupled to the flange of the inner pipe, so that the angular displacement of the extension pipe with respect to the housing causes an angular displacement of the centering ring with respect to the housing that is about half of the angular displacement of the extension pipe with respect to the housing, and so that axial tension upon the extension pipe with respect to the housing places each of the first, second, and third flex elements in compression.

23. The flexible pipe joint as claimed in claim 22, wherein the first flex element and the second flex element seal pressure within the extension pipe so that the third flex element is not subjected to the pressure within the extension pipe.

24. The flexible pipe joint as claimed in claim 22, wherein the inner pipe has an outer jacket, and the second flex element is disposed between the outer jacket of the inner pipe and the flange of the inner pipe, and which further includes a fourth annular elastomeric flex element disposed within the housing and coupling the outer jacket of the inner pipe to the outer jacket of the extension pipe.

* * * * *